(12) United States Patent
Huang et al.

(10) Patent No.: US 11,321,210 B2
(45) Date of Patent: May 3, 2022

(54) SYSTEM AND METHOD FOR CLOUD-DEVICE COLLABORATIVE REAL-TIME USER EXPERIENCE AND PERFORMANCE ABNORMALITY DETECTION

(71) Applicant: Huawei Technologies Co., Ltd., Shenzhen (CN)

(72) Inventors: Pai-Han Huang, Mountain View, CA (US); Ahmad Khodayari-Rostamabad, Mountain View, CA (US); Olivia Yuh Ru Lee, Mountain View, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/788,127

(22) Filed: Feb. 11, 2020

(65) Prior Publication Data
US 2020/0371892 A1   Nov. 26, 2020

Related U.S. Application Data

(63) Continuation of application No. PCT/US2018/055710, filed on Oct. 12, 2018.
(Continued)

(51) Int. Cl.
*G06F 11/00* (2006.01)
*G06F 11/34* (2006.01)
(Continued)

(52) U.S. Cl.
CPC ........ *G06F 11/3409* (2013.01); *G06F 11/302* (2013.01); *G06F 11/3006* (2013.01);
(Continued)

(58) Field of Classification Search
CPC .............. G06F 11/302; G06F 11/3006; G06F 11/3062; G06F 11/3409; G06F 11/3447; G06F 11/3612
See application file for complete search history.

(56) References Cited

U.S. PATENT DOCUMENTS 7,711,662 B2 * 5/2010 Buscema ............... G06N 3/086
706/13
8,554,703 B1 * 10/2013 Lin ........................ G06N 20/00
706/12
(Continued)

FOREIGN PATENT DOCUMENTS

CN    102117411 A    7/2011
CN    103988175 A    8/2014
(Continued)

*Primary Examiner* — Elmira Mehrmanesh
(74) *Attorney, Agent, or Firm* — Slater Matsil, LLP

(57) ABSTRACT

A computing device receives, from a remote device, one or more abnormality detection models for detecting anomaly of one or a plurality of applications with respect to one or more resource usage, obtains resource usage data associated with each application, determines, using the one or more abnormality detection models, whether each application has anomaly in a resource usage, and takes an action in response. The abnormality detection model is built using a machine learning technique at the remote device based on data collected from multiple devices. The resource usage data includes information about applications used by the computing device, e.g., usage or energy consumption of one or more hardware components or one or more services accessed by an application on the device. An abnormality detection result may include likelihoods of an application falling into an abnormality level in a plurality of abnormality levels.

20 Claims, 13 Drawing Sheets

Related U.S. Application Data

(60) Provisional application No. 62/572,320, filed on Oct. 13, 2017.

(51) Int. Cl.

| | | |
|---|---|---|
| *G06N 20/00* | (2019.01) | |
| *G06F 11/30* | (2006.01) | |
| *G06F 11/36* | (2006.01) | |
| *G06N 5/04* | (2006.01) | |
| *G06F 16/9038* | (2019.01) | |

(52) U.S. Cl.
CPC ...... *G06F 11/3062* (2013.01); *G06F 11/3447* (2013.01); *G06F 11/3612* (2013.01); *G06F 16/9038* (2019.01); *G06N 5/04* (2013.01); *G06N 20/00* (2019.01)

(56) References Cited

U.S. PATENT DOCUMENTS

| | | | |
|---|---|---|---|
| 9,361,175 B1 | 6/2016 | Bose et al. | |
| 10,459,827 B1* | 10/2019 | Aghdaie | A63F 13/67 |
| 10,635,557 B2* | 4/2020 | Kaluza | G06F 16/2379 |
| 2007/0289013 A1* | 12/2007 | Lim | H04L 63/1425 726/22 |
| 2015/0286820 A1 | 10/2015 | Sridhara et al. | |
| 2016/0337390 A1 | 11/2016 | Sridhara et al. | |
| 2016/0350173 A1* | 12/2016 | Ahad | G06F 11/0751 |
| 2016/0350198 A1 | 12/2016 | Neuvirth-Telem et al. | |
| 2017/0223036 A1* | 8/2017 | Muddu | G06F 16/9024 |
| 2018/0096261 A1* | 4/2018 | Chu | G06N 7/005 |
| 2019/0138423 A1* | 5/2019 | Agerstam | G06F 11/3447 |
| 2019/0162868 A1* | 5/2019 | Salman | G01V 1/48 |
| 2020/0134423 A1* | 4/2020 | Shinde | G06F 11/0787 |
| 2020/0372298 A1* | 11/2020 | Challis | G06F 11/302 |
| 2021/0019657 A1* | 1/2021 | Wu | G06Q 30/0185 |
| 2021/0073618 A1* | 3/2021 | Boussarov | G06N 3/08 |
| 2021/0124983 A1* | 4/2021 | Axenie | G06K 9/6263 |

FOREIGN PATENT DOCUMENTS

| | | |
|---|---|---|
| CN | 106104496 A | 11/2016 |
| CN | 106133642 A | 11/2016 |
| CN | 106776009 A | 5/2017 |
| JP | 2011138484 A | 7/2011 |
| JP | 2012247937 A | 12/2012 |
| JP | 2016173782 A | 9/2016 |
| JP | 2017517796 A | 6/2017 |
| KR | 20160142853 A | 12/2016 |
| WO | 2013055311 A1 | 4/2013 |
| WO | 2016191639 A1 | 12/2016 |

* cited by examiner

SYSTEM AND METHOD FOR CLOUD-DEVICE COLLABORATIVE REAL-TIME USER EXPERIENCE AND PERFORMANCE ABNORMALITY DETECTION

CROSS-REFERENCE TO RELATED APPLICATIONS

This application is a continuation of PCT Application No. PCT/US18/55710, filed on Oct. 12, 2018, which claims priority of U.S. provisional patent application Ser. No. 62/572,320 filed on Oct. 13, 2017 and entitled "System and Method for Cloud-Device Collaborative Real-Time User Experience Abnormality Detection". These applications are hereby incorporated by reference in their entirety.

TECHNICAL FIELD

The present disclosure relates generally to application abnormality detection, and, in particular embodiments, to a system and method for cloud-device collaborative real-time user experience and performance abnormality detection.

BACKGROUND

Computing devices are becoming increasingly important in people's daily life, and more and more applications or software programs have been developed for various user devices, such as smart phones, smart watch, tablets, laptops, computers, etc., to accommodate various needs of using computing devices. An application or process, when operating abnormally in a computing device, may significantly affect performance, power or energy consumption, and consequently user experience of the computing device. Abnormality detection of an application may help select and take appropriate actions to mitigate adverse impact of an application running abnormally.

SUMMARY

In accordance with an embodiment of the present disclosure, a method is provided that includes receiving, by a computing device, a first abnormality detection model from a remote device. The first abnormality detection model is trainable using a machine learning technique for detecting anomaly of an application in a resource usage. The method also includes obtaining resource usage data of the application according to the first abnormality detection model. The resource usage data includes information about usage or energy consumption of one or more hardware components or one or more services accessed by the application on the computing device. The method further includes determining, by the computing device using the first abnormality detection model, whether the application has anomaly in the resource usage based on the resource usage data obtained, and taking an action in response to determination on the anomaly of the application in the resource usage. By using one or more abnormality detection models, anomaly of one or more applications of a computing device may be detection in one or more resource usages.

In accordance with another embodiment of the present disclosure, a computer-implemented method is provided that includes obtaining data samples related to an application from a plurality of computing devices. The data samples includes information about usage or energy consumption of one or more hardware components or one or more services accessed by the application on the plurality of computing devices, and each data sample is associated with one of the plurality of computing devices. The method further includes assigning labels to the data samples. A label assigned to a data sample associated with a respective computing device indicates an abnormality level in a set of abnormality levels that the application has in a first resource usage on the respective computing device, and the first resource usage corresponds to a first abnormality parameter. The method also includes building an abnormality detection model using labeled data samples and a machine learning technique, the abnormality detection model detecting anomaly of the application in the first resource usage. Based on data samples obtained from the plurality of computing devices associated with the application, one or more abnormality detection models may be built using the embodiment methods. These abnormality detection models may be pushed to computing devices for detecting anomaly of the application on the respective computing devices. An abnormality detection model may be built for detecting anomaly of one or more applications with respect to one or more abnormality parameters.

In accordance with another embodiment of the present disclosure, a method is provided that includes detecting whether an application running on a computing device has anomaly in a resource usage, based on resource usage data obtained for the application and using an abnormality detection model that is built using a machine learning technique, whereby generating an abnormality detection result for the application; taking an action on execution of the application in response to the abnormality detection result; collecting, for a period of time, data about abnormality detection results of the application and about corresponding actions taken in response to the abnormality detection results; and adjusting the action to be taken in response to the abnormality detection result using an adaptation or customization model based on the data that is collected. In this way, actions taken in response to abnormality detection result may be customized based on user behavior and usage patterns to help improve user experience and device performance.

Embodiments of the present disclosure helps improve user experience by reducing excessive energy consumption caused by applications running abnormally in a computing device. This embodiments becomes more useful for computing devices which are battery-operated, and therefore the energy source is limited in capacity. If an application or a process or a tool or software works abnormally in the computing device for a period of time, it causes battery to be drained faster than it normally should, and therefore may cause the user of the device to be unsatisfied with the performance and efficiency of the device. The abnormality is detected using data collected from analysis of usage of hardware components, services and resources by the application. If the abnormality in energy consumption or resource usage by an application occurs for a period of time, it may cause an excessive increase in temperature of the device, which may cause damage to the device or their components, or degrade the performance of the device or its components. Therefore, abnormality detection of the embodiments may also prevent excessive heating or thermal issues of the device. Embodiments of the present disclosure may also detect cases or events where an application or processes abnormally uses a resource, a component or a service in a computing device, and this helps prevent the application from degrading the overall performance of the device or the overall user experience. When a resource is used abnormally, it may degrade the performance of the resource as it is allocated to other applications or to system processes, and as a result, the device may function with reduced performance. Embodiments of the present disclosure improve user experience, improve performance, improve battery life, reduce overall energy consumption, reduce excessive heat or thermal issues, and help provide a more normal and efficient utilization of resources or software or hardware components available in a computing device.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
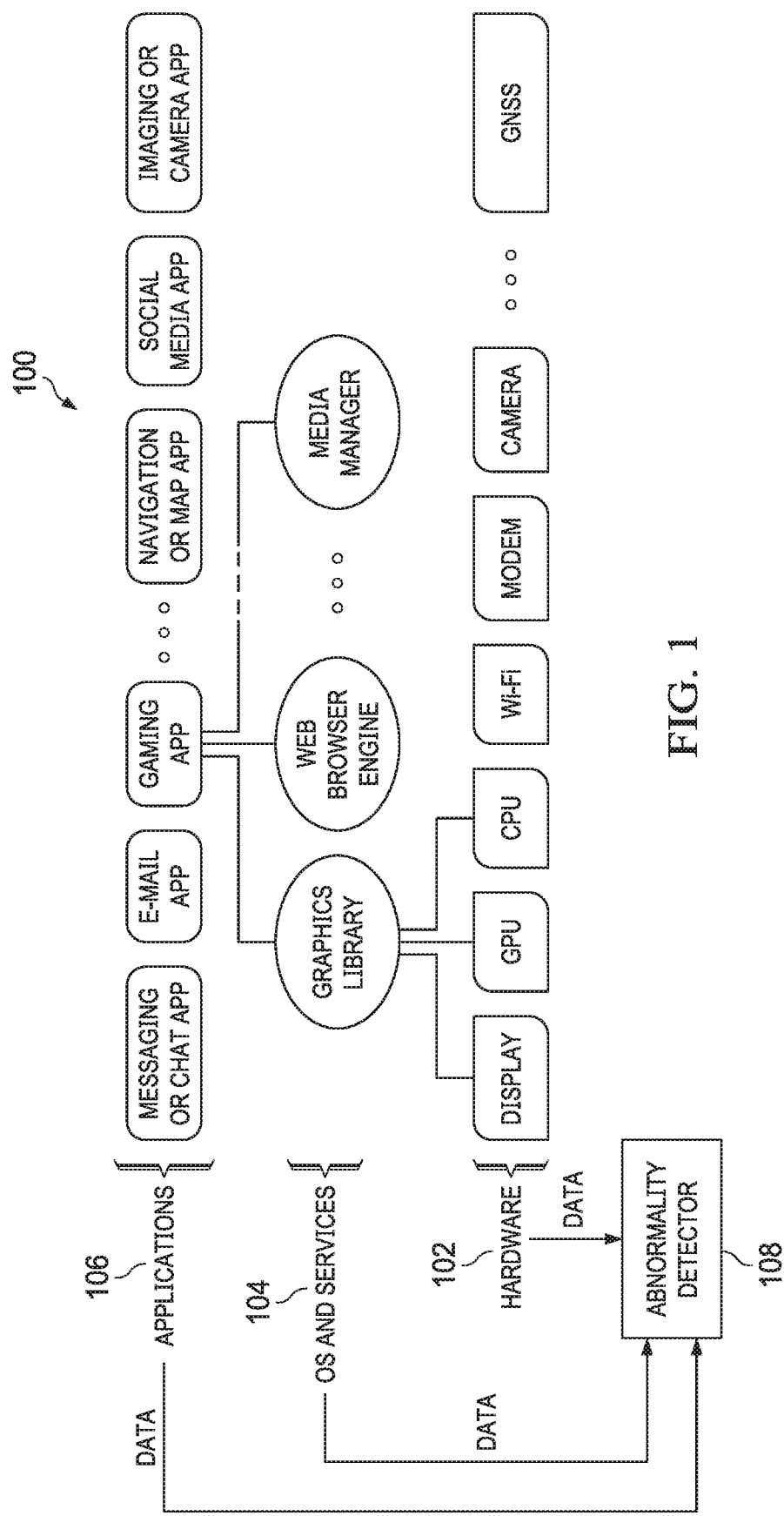
FIG. 1 illustrates a diagram of an embodiment architecture of a computing device.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Embodiments of the present disclosure provide methods for application anomaly detection. Applications operating abnormally on a device may significantly affect performance, power or energy consumption, and consequently user experience of the device. Thus, it would be desirable to be able to detect anomaly of one or more applications running on a device. In accordance with some embodiments, a device may receive an abnormality detection model from a remote device. The abnormality detection model is trainable using a machine learning technique for detecting anomaly of an application in a resource usage. The device may obtain resource usage data of the application according to the abnormality detection model. The resource usage data may include information about usage or energy consumption of one or more hardware components or one or more services accessed by the application on the computing device. The device may determine, using the first abnormality detection model, whether the application has anomaly in the resource usage based on the resource usage data obtained, and take an action in response to determination on the anomaly of the application in the resource usage. By using one or more abnormality detection models, anomaly of one or more applications of a computing device may be detection in one or more resource usages.

In some embodiments, a method may be provided for building an abnormality detection model. The method may obtain data samples related to an application from a plurality of computing devices. The data samples includes information about usage or energy consumption of one or more hardware components or one or more services accessed by the application on the plurality of computing devices, and each data sample is associated with one of the plurality of computing devices. The method may then assign labels to the data samples. A label assigned to a data sample associated with a respective computing device indicates an abnormality level in a set of abnormality levels that the application has in a first resource usage on the respective computing device, and the first resource usage corresponds to a first abnormality parameter. The method builds the abnormality detection model using labeled data samples and a machine learning technique. The abnormality detection model detecting anomaly of the application in the first resource usage. Based on data samples obtained from the plurality of computing devices associated with the application, one or more abnormality detection models may be built using the embodiment methods. These abnormality detection models may be pushed to computing devices for detecting anomaly of the application on the respective computing devices. An abnormality detection model may be built for detecting anomaly of one or more applications with respect to one or more abnormality parameters.

In some embodiments, abnormality detection may be customized for a particular device. For example, a device may detect whether an application running on the device has anomaly in a resource usage, based on resource usage data obtained for the application and using an abnormality detection model that is built using a machine learning technique. Thus, an abnormality detection result is generated for the application. The device may take an action on execution of the application in response to the abnormality detection result. The device may collect, for a period of time, data about abnormality detection results of the application and about corresponding actions taken in response to the abnormality detection results, and adjust the action taken in response to the abnormality detection result using an adaptation or customization model based on the data that is collected. In this way, actions taken in response to abnormality detection result may be customized based on user behavior and usage patterns to help improve user experience and device performance.

Computing devices are becoming more and more important in people's daily life, and an increasing number of applications or software have been developed for various computing devices to accommodate a variety of needs and requirements. A computing device herein may refer to an electronic device (or equipment, apparatus) that operates using a central processing unit (CPU) or multiple processing units. A CPU may have one or more than one chip. A CPU may include one or more cores, a microprocessor, a microcontroller, a processor, a graphic processing unit (GPU), a neural network processing unit (NPU), a controller, or any combination thereof. The computing device is configured to process information and/or to perform calculations. The computing device follows software program to perform sequences of mathematical and logical operations. Examples of a computing device may include a computer, a laptop, a tablet, a smartphone, a wearable electronic device, a server, a fitness equipment, an electronic measurement device, a monitoring device, a control device, an electronic assistant device, a digital pet, an autonomous vehicle, a navigation device, a driving device, a robot, etc.

FIG. 1 illustrates a diagram of an embodiment architecture 100 of a computing device. The architecture 100 illustrates components included in the computing device. As shown, the computing device includes a plurality of hardware components, such as a display, a GPU, a CPU, a Wi-Fi interface, a modem, a camera, a global navigation satellite system (GNSS). The computing device may also include other hardware components 102, such as Bluetooth, input/output (IO) devices, micro-electro-mechanical systems (MEMS), mechanical devices, actuators, or sensors. The computing device also includes an operating system (OS) and services 104, which are software programs or tools used to support operations of the computing device. As shown, the computing device includes services such as graphics library, web browser engine, and a media manager. The OS and the services utilize the hardware components to perform corresponding functions. For example, the graphics library uses the display, the GPU, and the CPU for performing a graphics related function. The computing device may also include one or more applications 106. An application may be referred to as a software program installed and executable on a computing device. An application may be installed on a computing device by a user, or through installation of another application. An application may be downloaded from a remote device, such as a remote server or a cloud server, and installed on a computing device. An application may also be pre-installed on a computing device as an integrate part of the computing device. An application may be running on the background, foreground, or both the background and foreground. As shown, the computing device includes applications including a message or chat application, an E-mail application, a gaming application, a navigation or map application, a social media application, and an imaging or camera application. Examples of an application may also include a weather report application, a music or video playback application, a web-browsing application, a telecommunication application, a search application, a virus scanning application, computer tools, etc. An application may also include a process or system tool running on a computing device. The applications may utilize one or more of the services and the hardware components in operations of their purposes. For example, execution of the gaming application may utilize the graphics library, web browser engine, the media manager, and other services. The computing device may also include an abnormality detector 108, which may be used to detect whether an application has anomaly or operate in an abnormal way based on services and hardware components that are used or accessed by the application. The abnormality detector 108 may receive data (e.g., usage data) about one or more resources of the computing device (such as one or more hardware components and/or one or more services) that are accessed or used by each application executed on the computing device, and associate usage of each of the resources to the corresponding application. The abnormality detector 108 may then detect anomaly of an application based on resource usages by the application.

An application in a computing device, when not operating as it is designed or expected (this is herein referred to as that the application is operating abnormally or in an abnormal state, or the application has anomaly or abnormality), may significantly affect performance, power or energy consumption, and consequently user experience of the computing device. For example, in some cases, an application in an abnormal state may keep running (or keep performing repetitive operations) in a state without stopping or changing to a different state. This may be the case when the application gets into an infinite loop and cannot get out, e.g., due to a software bug. This may also be the case when the application keeps attempting to transit from one operating mode or state to another operating mode or state but fails. This may also be the case when the application keeps attempting to access a hardware component but fails. The application's keeping running may drain power of a computing device much faster, cause overheat and lower performance of the computing device. In some cases, this may also cause security issue to the computing device. For example, a smartphone may need to be cut off from wireless connection during a meeting of high confidentiality but could not be done so.

It would be appreciated that abnormality of an application running on a computing device can be detected, and corresponding actions can be taken to avoid or reduce impact of the abnormality of the application, or to provide notification or warning to users. When an application is behaving abnormally, e.g., consuming a lot of energy, there is no way to access the inside of the application to see what is happening and to determine that the application has anomaly. Even if the application's code is available, in some cases, it is generally hard to determine that the application has anomaly based on a bug found of the application. It is also generally hard to find a bug of the application that causes the anomaly of the application, or determine a cause of the anomaly of the application, e.g., surge in energy usage. However, an application running abnormally may be reflected in resource usage by the application. Resource usage may include usage of resources of any hardware component and/or software component, such as memory, display, speaker, modem, battery, CPU, GPU, or services, e.g., a media manager, etc. For example, an application having anomaly may consume unexpected amount of battery power, have an unexpected usage of CPU for background or foreground, self-restart for an unexpected number of times, take longer time to access a modem, or have unexpected usage of memories, etc. By monitoring resource usage by the application, whether an application is running abnormally may be detected, and actions may be taken to handle the abnormality of the application, such as freezing the application from running.

Embodiments of the present disclosure monitor relevant device information, environmental data, resource usages of one or more hardware components as well as services used by an application, e.g., for a period of time, and utilize one or more abnormality detection models to determine whether the application has anomaly based on the monitored resource usages. The one or more abnormality detection models may be built using a machine learning technique in a remote device, such as a remote server or a cloud server, based on resource usage data collected from a plurality of computing devices, and may be deployed on the computing device for application abnormality detection. A single abnormality detection model may support detecting abnormality in several applications used or accessed by the device during a period of time. A single abnormality detection model may also detect abnormality in several resource usage or abnormality parameters at the same time.

Figure 2:
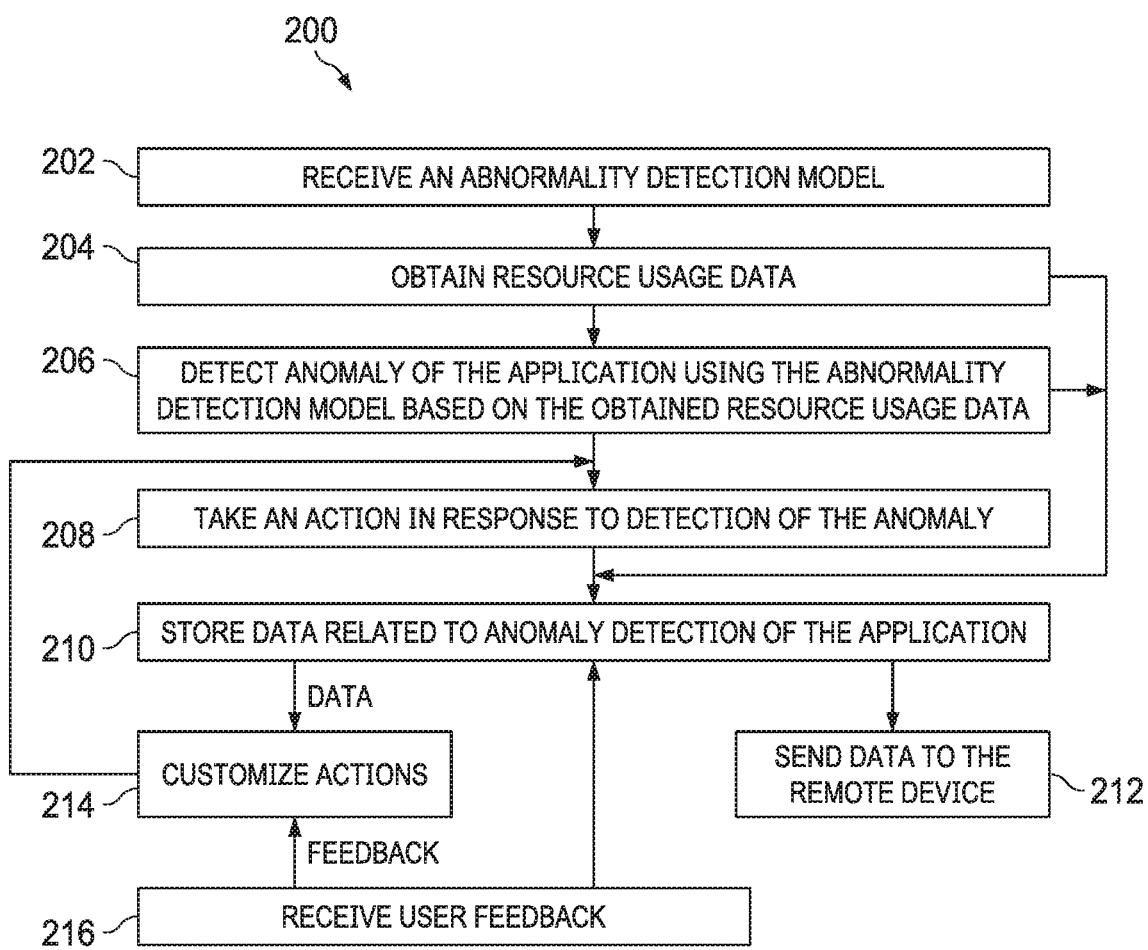
FIG. 2 illustrates a flowchart of an embodiment method for application anomaly detection.

FIG. 2 illustrates a flowchart of an embodiment method 200 for application anomaly detection. The method 200 is indicative of operations performed at a computing device or a user device. As shown, at step 202, the method 200 receives an abnormality detection model. The abnormality detection model may be implemented as a software program. In one example, the method 200 may download the abnormality detection model from a remote device, such as a remote server or cloud server or a nearby server or a support device in the network, and install and run the abnormality detection model in the computing device. In another example, the abnormality detection model may be pushed to the computing device, e.g., by a remote device. The abnormality detection model may be executed in the computing device and run in the computing device all the time. The abnormality detection model may be executed by a separate processing unit, such as a tensor processing unit (TPU), a GPU, a neural processing unit (NPU), or a separate CPU. The abnormality detection model may also be referred to as an abnormality detector or predictor. The abnormality detection model may be a computational algorithm that includes calculations, mathematical operations and/or analysis that are needed to perform the task of abnormality detection given the input data. The abnormality detection model may be built using a machine learning technique. For example, the abnormality detection model may be a classification model, a regression model, a deep neural network model, a model built using a Bayesian network, a decision network, an ensemble of decision trees, a regularized regression model, or similar classification, prediction or regression models and their combinations. Examples of neural network models that may be used include a multi-layer fully connected network, a convolutional neural network (CNN or ConvNet), a recurrent neural network (RNN), a reinforcement learning, or their variations or combinations. Building of the abnormality detection model will be described later in the disclosure. The abnormality detection model may be configured to detect anomaly of one or more applications in resource usage of one or more resources of the computing device.

In one embodiment, the abnormality detection model may be received by a computing device as a software module (e.g. a library, an executable or other applicable code) associated with metadata specifying or describing the abnormality detection model. The software module may include implementation of underlying algorithm(s) of the abnormality detection model. The computing device can instantiate or load the received software module configured according to the associated descriptions to perform the detection operations. In some other embodiments, the abnormality detection model may include a core engine (e.g. based on an underlying algorithm implementing the detection operations, such as a trainable neural network, or other applicable models) which has been configured in the computing device. The detection model received by the computing device may include settings (e.g. number of inputs, structure and types of models, number of layers, number of training cycles, weights trained by usage data collected from other devices, etc.) in one or more files. The computing device can dynamically configure/customize the core engine according to the files received for performing the abnormality detection operations.

In one embodiment, the abnormality detector or the abnormality detection model includes a system tool, software or daemon that runs one or more tasks, which may include data collection, user experience and device performance monitoring, performance monitoring of each resource by each application, data pre-processing, data analytics, resource usage estimation, usage and energy accounting, database management, abnormality detection, and customization or adaptation algorithms. The abnormality detection model may take actions based on abnormality detection results and requirements from a remote device or server. Resource calculations or estimation may include estimating energy of each resource, or modeling power consumption of each resource, if needed, using available recorded data. In one example, an abnormality detection tool or daemon may use a settings (or configurations) file, and an abnormality detection model file (or files which for example include a plurality of deep neural network models), and these files collectively define the control parameters of the abnormality detection daemon, the structure and algorithms of neural network models, parameter values of related algorithms, and weights of neural network models. In a case where the abnormality detection model is based on deep neural network algorithms, the abnormality detection tool or daemon may run the abnormality detection models on an NPU, a TPU or a GPU on a device, in order to speed up the execution or detection process. Some or all parts of the abnormality detection model including the system tool or daemon, the configurations, and the abnormality detection model files, may be updated or revised regularly or on demand. In another embodiment, the abnormality detection tool or daemon may send device and resource usage data to a remote device or to a support device or server, and the abnormality detection model may be executed on the support or remote device, and the results may then be sent back to the computing device for further actions.

A resource usage may refer to usage or energy consumption of a resource that is used or accessed by the application for execution. A resource may include a hardware component of the computing device, e.g., memory, display, speaker, modem, battery, CPU, GPU, camera, sensors, flashlight, audio, etc. used by the application, or a software component of the computing device, e.g., a service used by the application. Thus, a resource usage is related to a particular resource. An application may be determined to have anomaly in resource usages of one or several resources of the computing device. A usage of a resource may refer to an amount of energy consumed by the resource (for executing an application), a frequency that the resource is used or accessed (for executing an application), a duration that the resource is used or accessed (for executing an application), a size or number of the resource, or a resource parameter or attribute that is used (for executing an application), or any combination thereof. Examples of resource usages may include usage or energy consumption of CPU in background (BG), CPU in foreground (FG), Wi-Fi BG, Wi-Fi FG, modem BG, modem FG, GPS BG, GPS FG, camera BG, or camera FG. Resource usages may also include wake-lock holding time, a number of self-start of an application, alarm, IO device usage, total energy usage, or memory usage. Each resource usage corresponds to a related parameter. A value of a parameter may be assigned according to a measurement of the corresponding resource usage. For example, energy consumption of CPU BG corresponds to a parameter of CPU BG energy, IO device usage may correspond to a parameter of IO device access rate, modem BG usage may correspond to a parameter of modem on-time in BG, Wi-Fi usage may correspond to a parameter of Wi-Fi lock holding time, etc. These parameters may be referred to as abnormality parameter, with respect to which anomaly of an application is detected. An abnormality parameter may also include a more complex or secondary parameter or attribute, which is extracted or calculated from some form of combination of several resource usages or other relevant data collected in the device. Anomaly of an application in resource usage of one or more resources may be determined based on one or more abnormality parameters corresponding to usages of the one or more resources.

At step 204, the method 200 obtains resource usage data of resources used by the application. The resource usage data may be used for detecting anomaly of the application using the abnormality detection model. The method 200 may obtain the resource usage data according to the configuration of the abnormality detection model. The method 200 may obtain resource usage data of every resource used or accessed by the application. In one example, the computing device may monitor the resources used by the application, collect the resource usage data of the resources according to requirements of the abnormality detection model, and provide the collected resource usage data to the abnormality detection model. In another example, the abnormality detection model may be configured to monitor and collect the resource usage data of the resources used by the application. In another example, the abnormality detection model may calculate or estimate an amount of energy consumed by each resource, or may model an amount of power consumed by each resource, using recorded data. Algorithms for energy estimation or power modeling may be trained or designed using data obtained from a plurality of devices or using the insight about each resource. In another example, the abnormality detection model may calculate or generate a set of resource usage parameters, quantitative features, secondary or more complex parameters or attributes using raw data or initial variables extracted or collected from the device. The resource usage data may include information about usage or energy consumption of one or more hardware components or one or more services of the computing device. The device may monitor and collect resource usage data corresponding to each and every application or process used or accessed within a device.

In some embodiments, the resource usage data may include energy consumption, usage, an energy pattern, or a usage pattern of a hardware component in the computing device under one or more execution condition of the application. An execution condition may include foreground usage, background usage, screen-on usage, or screen-off usage or consumption of a resource in the device by an application. An execution condition may indicate whether the application is executed in the foreground, in the background, with screen on, or with screen off. A usage pattern of a hardware component may include a series of measurements of usages of the hardware component during a period of time (i.e., a time series or sequences of usages). In other embodiment, a usage pattern may also include frequency, average, maximum, minimum, rate, and/or other applicable statistics collected/identified from the measurements of usages of this hardware component. An energy pattern of a hardware component may include a series of energy consumption of the hardware component during a period of time (i.e., a time series or sequences of energy consumption). In one example, a usage or energy consumption of a hardware component may include a total usage or total energy consumed by the hardware component for a period of time, e.g., 24 hours. In another example, a usage or energy consumption of a hardware component may include a usage or energy recently (e.g., during the last 5 minutes of collecting the data) consumed by the hardware component. In this case, the usage or energy consumption of the hardware component may also include latest data of other relevant device attributes, such as a brightness level of display. In another example, a usage or energy consumption of a hardware component may include a sequence of usage or energy consumption (e.g., usage and energy consumption as time series) by a hardware component for a period of time, e.g., with a certain resolution, e.g., for the last 24 hours with a 5-minute resolution (e.g., every 5 minutes). In each case, other relevant device and environmental data, such as display brightness or Wi-Fi reception quality, may also be included, e.g., to show conditions under which such a usage or energy consumption is resulted. The resource data may further include data regarding usage of services, software components or system tools that are used by the application executed in the computing device.

In some embodiments, the resource usage data may include foreground usage of a CPU, background usage of a CPU, wake-lock holding time, a number of self-starts, on-screen time of the application, off-screen time of the application, cellular, telecommunication or modem usage and pattern, Wi-Fi or network usage and pattern, memory usage, multimedia usage and pattern, imaging sensor or camera usage and pattern, usage of a GPU, usage and pattern of any other sensor or hardware component, IO device usage comprising a number of times for accessing an IO device, or location service usage and pattern comprising a number of location services that are used.

In some embodiments, the resource usage data may also include usage of graphic processing services, usage of neural processing services, a number of notifications of arrival, usage of audio services, usage of multimedia services, usage of Bluetooth, usage of Wi-Fi services, usage of telecommunication services, usage of modem or radio services, usage of camera services, usage of location or navigation services, usage of sensor services, usage of messaging services, usage of human interface services, usage of media manager services, usage of notification manager services, usage of each of system services, quality of Wi-Fi or network access services, quality of modem or telecommunication services, audio volume and quality, audio route, multimedia route, ambient light distribution, display brightness distribution, temperature, humidity, electric current of battery or other components, voltage of battery or other components, or a number of access to user data.

In some embodiments, the resource usage data may include information about the computing device, e.g., a model of the computing device, a product version of the computing device, or about the application, e.g., an application name or application identifier of the application (used for identifying an application within a plurality of applications), an application version. The resource usage data may further include an environmental condition of using the computing device, e.g., a location of the computing device, or date or time of execution of the application, or performance information of the computing device.

At step 206, the method 200 detects anomaly of the application using the abnormality detection model based on the obtained resource usage data. The abnormality detection model may take the resource usage data as input, and determine whether the application has anomaly in resource usages of one or more resources or abnormality parameters of the computing device. The one or more resources may be pre-configured in the abnormality detection model, and the abnormality detection model may output respective abnormality detection results with respect to resource usages of the one or more resources. For example, the abnormality detection model may detect whether the application has anomaly in resource usage of resources such as CPU BG, CPU FG, wake-lock, alarm, Wi-Fi, and modem. The abnormality detection model may be configured to detect anomaly of multiple applications in resource usages simultaneously. The abnormality detection model may predict or detect abnormality in multiple resource usages or abnormality parameters simultaneously. Multiple levels or classes of abnormality may be detected or identified by the abnormality detection model simultaneously.

Figure 3:
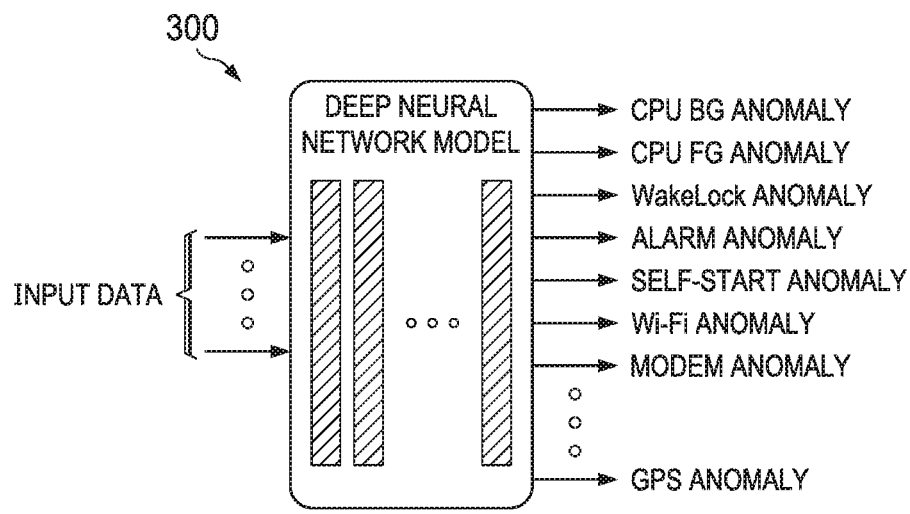
FIG. 3 illustrates a diagram of an embodiment abnormality detection model.

FIG. 3 illustrates a diagram of an embodiment abnormality detection model 300 for detecting anomaly of one or several applications used by a device. The abnormality detection model 300 in this example is a deep neural network trained using a deep learning technique. As an illustrative example, resource usage data input into the abnormality detection model 300 include usage and energy consumption of each and every hardware components of the device, such as CPU, Wi-Fi, GPU, GNSS, display, BT, audio, a flashlight, a front camera, a rear camera, and sensors. The input data may also include other relevant device, performance or application attributes, such as, an application name or application identifier, CPU wake-lock, modem reception quality, a geographic region, and a date. With the resource usage data input, the abnormality detection model 300 may at once output abnormality detection results indicating whether the application has CPU BG anomaly, CPU FG anomaly, wake-lock anomaly, alarm anomaly, self-start anomaly, Wi-Fi anomaly, modem anomaly, GPS anomaly, or other anomaly. The abnormality detection model 300 may detect abnormality in several applications used by the device, in which data of applications are inputted into the model as a batch of data, each data sample belonging to one application.

The abnormality detection model 300 may use all resource usage and device data recorded, or may use a portion of the input data. The input data to the abnormality detection model may include one or more attributes or quantitative features calculated from some form of combination or mathematical mapping of several resource usage parameters, device or environmental data or information. For example, one of the attributes as part of input data to the abnormality detection model 300 may be extracted by applying a mathematical operation or mapping over four resource usage data or parameters to obtain a more useful, a more relevant or a more discriminatory attribute for performing abnormality detection. The input attribute design and building using combination of input parameters or attributes may be determined based on data analysis performed, e.g., in a remote server, using data collected from a plurality of devices.

In some embodiments, the abnormality detection model 300 may generate abnormality detection results that include levels of abnormality. In one example, the levels or classes of abnormality may include no abnormality, abnormality, high abnormality, or excessive abnormality. In another example, the levels of abnormality may also include one or more levels of usage, e.g., high usage, or excessive usage. For example, the abnormality detection model 300 may detect that the application has high abnormality with respect to CPU BG usage, the application has excessive abnormality with respect to modem usage, or the application has excessive usage on CPU FG. An abnormality detection model that detects a level of abnormality that an application has may be referred to as an anomaly level detection model. In some embodiments, the abnormality detection model 300 may also produce estimation of probabilities that the application falls into a set of levels of abnormality (which may be referred to as abnormality probabilities or likelihoods). For example, for a resource usage or abnormality parameter, the abnormality detection model 300 may estimate that an application has a probability of P1% for being normal (or having no abnormality), probability of P2% for having excessive use of resource, P3% for being abnormal, and P4% for being highly abnormal, where p1+p2+p3+p4=100%, in a case that the model detects 4 levels of abnormality. An abnormality detection model that produces estimated probabilities of an application falling in a set of levels of abnormality may be referred to as an abnormality likelihood estimation model.

Referring back to FIG. 2, in some embodiments, before proceeding to step 206, the method 200 may check whether a service used by the application is a sensible scenario. A sensible scenario may be related to constraints, privilege and/or restrictions configured for an application to invoke certain services (e.g. system service) during runtime. For example, the method 200 may check whether playing music on background by a social media application or a messaging application, is allowed and is considered as a normal use case. If the usage scenario of the service is sensible, the method 200 may not need to run the abnormality detection model to detect whether background usage of a resource involved in such service is abnormal. If the usage scenario is not sensible, then the method 200 may feed the obtained data to and run the abnormality detection model to detect whether the related usage and energy consumption is abnormal. In some embodiments, usage and energy consumption by hardware components and other input data, as well as usage of services may be inputted into an abnormality detection model, e.g., the model 300. The abnormality detection model may then generate abnormality detection outputs automatically taking into account of sensible scenarios for each application along with other input and usage data.

At step 208, the method 200 takes an action in response to detecting that the application has anomaly. Taking an action herein may refer to performing a specific operation. For example, upon the computing device determining that the application has anomaly or is working abnormally under a condition, the computing device is configured to perform an operation in response. The operation may be pre-configured, and involves execution of a software program, an operation on the device, and/or limiting resource usage or limiting access to one or more resources by an application that is detected to be behaving abnormally. An action may be taken so that negative impact of the application's abnormality is reduced or avoided. In one example, the abnormality detection model may detect multiple abnormality levels or estimates the severity of the resource usage or abnormality of one or more application in using one or more resources, and an action taken in response for each application may depend on the detected abnormality level and/or the importance of the resource usage. In one example, an action may be taken to freeze running of the application. In another example, an action may be taken to freeze running the application for a period of time. In another example, an action may be taken to limit some resources and or services available to the application. In another example, an action may be taken to kill the application. In yet another example, an action may be taken to re-start the application. In yet another example, a notification, e.g., an abnormality notification (e.g. a user interface pop up message, sound alert, instant messaging, or other applicable mechanism to inform a user or system), may be given to a user or controller of the computing device. The notification may indicate the occurrence of the abnormality, so that the user may take an action that he or she deems appropriate in response. The notification may indicate an abnormality detection result for the application. The notification may also indicate a list of actions that the user can choose in response to the occurrence of the abnormality. In some cases, the user may take no action regardless of the abnormality notification, based on his/her preference, experience or expertise.

In some embodiments, a list of actions may be pre-determined corresponding to different levels of abnormality, or corresponding to estimated probabilities, with respect to each abnormality parameter. For example, the abnormality detection model detects anomaly of the application in CPU FG usage in accordance with a set of levels of abnormality, including normal (or no abnormality), excessive usage, abnormal, and highly abnormal. Actions pre-determined corresponding to the set of levels of abnormality may include "None" (i.e., no action), "Notification" (i.e., providing a notification), "Freeze" (i.e., freezing or stopping the application for a period of time), "Re-start" (i.e., re-starting the application"), respectively, as shown in Table 1. Thus, the computing device may select and take a pre-determined action in response to an abnormality detection result based on the correspondence between the set of levels of abnormality and the pre-determined actions. In some embodiments, a combination of actions may be taken for an abnormality level. In some embodiments, the action may also be based on the duration of an abnormality occurring in an application. For example, if an abnormality of an application with respect to a resource usage persists for a period of time longer than a threshold, an action to be taken may be changed.

TABLE 1

| Level of Abnormality | Action |
| --- | --- |
| Normal | None |
| Excessive usage | Notification |
| Abnormal | Freeze |
| Highly abnormal | Re-start |

At step 210, the method 200 stores data related to anomaly detection of the application. The stored data may include the resource usage and other relevant data obtained at step 204, detection results generated at step 206, actions taken at step 208, abnormality parameters of the application, a usage pattern of the application, user experience feedback or user preferences, e.g., received at step 216. The method 200 may record some portion or all of the data at an interval for a period of time, e.g., recording abnormality detection results for every 5 minutes for 2 months. Using the recorded data, the method may estimate user behavior on the application or a usage pattern of the application on the computing device. At step 212, the method 200 may send the stored data to the remote device. The stored data may be sent to the remote device periodically, or on demand. The stored data sent to the remote device may be used to train or update one or more abnormality detection models.

At step 214, the method may customize or adapt actions. In some embodiments, the method 200 may adjust actions taken by the computing device in response to detecting an abnormality level of the application, based on the data recorded at step 210 and user feedback information. For example, the method 200 may take actions according to Table 1 above. The method 200 may determine an anomaly pattern of the application with respect to an abnormality parameter, e.g., CPU foreground usage, based on the abnormality results of the application and corresponding actions taken that are recorded for a period of time, e.g., 2 weeks. If the histogram of detected abnormality levels, or anomaly pattern of the device, shows that the application had a large number (e.g. more than a threshold number) of excessive usage (e.g. more than a threshold amount of usage) for two weeks, while no actions have ever been taken by the user in response, the method 200 may determine that the application actually is running normally, and thus adjust the action corresponding to the abnormality level of excessive usage from "notification" to "none". This may be the case that the excessive use of the CPU foreground usage for this application is acceptable to the user, or is deemed normal by the user. In another example, the anomaly pattern shows that the application had a few instances (e.g. less than a threshold number of instances) of excessive usage for two weeks and no abnormality or excessive abnormality was detected, and actions have been taken by user sometimes to re-start the application. In this case, the method 200 may determine that the application (and the user or device) is mainly in a low usage group, and the excessive usage is actually considered as abnormal for this user or device. The method 200 may adjust the action (e.g. select a different operation) corresponding to the abnormality level of excessive usage from "notification" to "freeze". In yet another example, the method 200 may adjust all the actions in Table 1 to "notification" due to user experience feedback information, e.g., the user wants to control what to do to the application in view of abnormality detection results. For example, the user may want to freeze the application if high abnormality is detected for a period of time, or re-start the application if abnormality of the application persists for a period of time. In this way, actions to be taken by the computing device are customized to specific requirements, needs or behavior of the user of the computing device. Historical data may be produced for the application, and the historical data may include abnormality detection results of the application, actions taken in response to the abnormality detection results of the application, usage patterns of the application, energy consumption patterns of the application, user feedback, or any combination thereof. The historical data may be used to determine how an action may be determined or adjusted. The actions may also be customized using a model, such as a machine learning model, based on the historical data and an adaptation or customization mechanism (e.g. based on a customization algorithm). In some embodiments, in addition to the history or pattern of abnormality detection results observed through a period of time, other relevant information may be used as input to the customization algorithm, including the patterns of resource usages, other relevant device or user information including location, date or time of usage.

Figure 4:
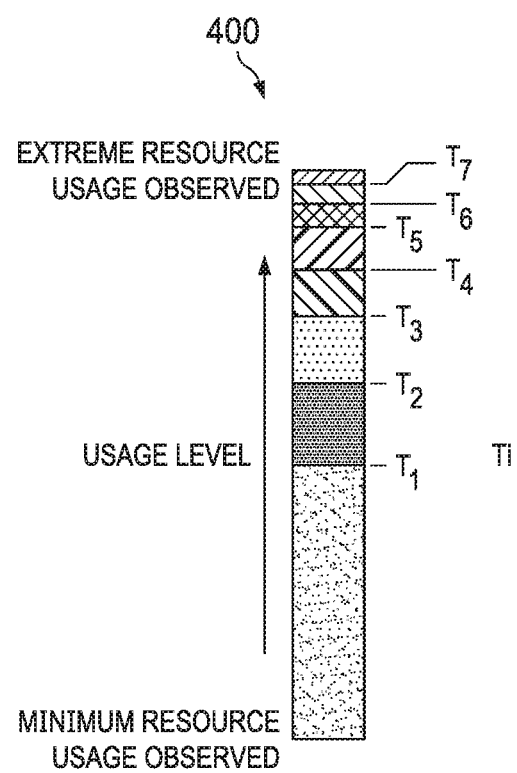
FIG. 4 illustrates a diagram showing embodiment usage levels of a resource.

In some embodiments, the abnormality detected by the abnormality detection model may have multiple levels or classes, referred to as abnormality levels. The multiple levels or classes may be determined based on multiple abnormality thresholds. FIG. 4 illustrates a diagram showing embodiment usage levels of a resource used by an application. The usage levels go from a lowest level (e.g., minimum resource usage observed) to a highest level (e.g., extreme resource usage observed). In this embodiment, different abnormality levels may be defined for anomaly detection of the application with respect to the usage of the resource according to a set of abnormality thresholds T1-T7 (may also be referred to as usage level thresholds). For example, resource usage higher than T7 may be defined as extremely abnormal, e.g., the usage of the resource by the application is above 99% in the population of devices (or a plurality of similar devices) when considering the usage distribution in the plurality of devices. This may be an extremely rare or unusual usage case. Resource usage between T7 and T6 may be defined as excessively abnormal, e.g., the usage of the resource by the application is between 96% and 99% in the population of devices. This may also be a highly rare or unusual case. Resource usage between T2 and T1 may be defined as relatively high usage, e.g., the usage of the resource by the application is between 50% and 65% of the plurality of devices. Resource usage lower than T1 may be defined as normal. In some embodiments, even though several levels of abnormality may be detected and recognized, actions to be taken in response may be limited to two or three actions. For example, resource usage less than T4 may be considered as normal (thus no action is taken), and resource usage above T4 is considered as abnormal (which might mean the application is frozen, for example, no matter whether the resource usage is above T5, T6, or T7).

In some other embodiments, the abnormality of the application may be characterized by a continuous abnormality parameter, e.g., a continuous usage parameter or attribute, instead of a multiple abnormality levels or classes. In such cases, for each application running on a computing device, an abnormality detection model estimates or predicts a continuous abnormality parameter given the input data collected from the computing device, and an action taken in response may be based on the estimated or predicted abnormality parameter value and a set of thresholds. For example, the continuous abnormality parameter may be compared with the set of thresholds, and which action to take may then be determined based on the comparison result. In such cases, the abnormality detection model may be referred to as an abnormality estimator, an abnormality predictor, or a resource usage level estimator. The set of thresholds used may be a common set of thresholds used for all applications running on the computing device, or each application may have a different set of thresholds used to determine which action or actions to take based on the value or a range of the estimated abnormality parameter.

In some embodiments, application anomaly detection may be customized based on user feedback, user experience, usage patterns, or abnormality patterns of an application in a particular device. For example, user feedback and control may be received to adjust the criterion used by the abnormality detection model for determining the levels of abnormality. The user may influence what levels of abnormality or thresholds are to be applied in anomaly detection of the application, or may determine how strict the resource usage abnormality detection and control is applied. Using FIG. 4 as an illustrative example, if the default case used by the abnormality detection model for deciding whether to take a freeze action is when the abnormality level is above threshold T4, the user may decide to use a less restrictive abnormality assessment. Then user feedback, e.g., a user instruction or a setting control may be provided to the abnormality detection model, which may enforce the abnormality detection model to use T5 to determine whether or not the application is abnormal in a resource usage (e.g., resource usage higher than T5 is abnormal, and lower than T5 is normal). In another example, if the user just prefers a minimal control over resource usage or energy consumption, then the user may, e.g., through a settings control, instruct the abnormality detection model to use a higher threshold (e.g., T6 or T7) as a threshold to detect whether or not the application is abnormal in a resource usage.

Figure 5:
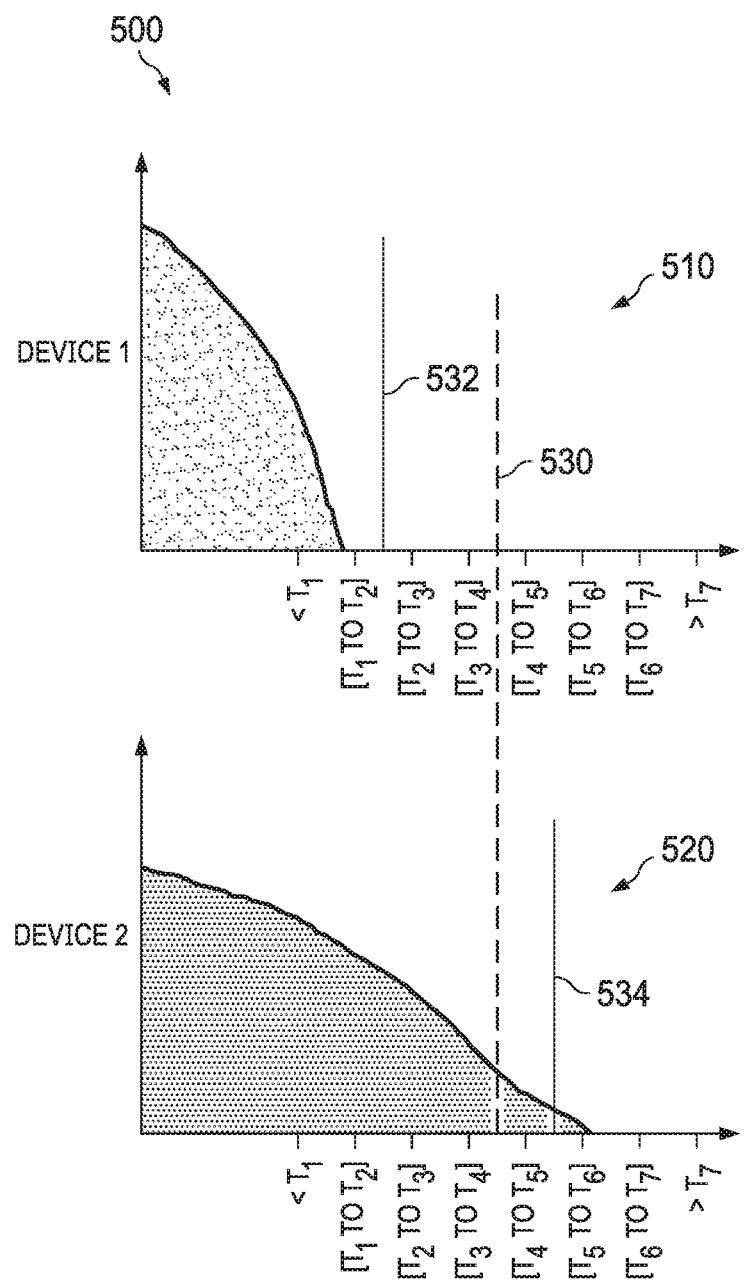
FIG. 5 illustrates a diagram of an embodiment method for customization of application anomaly detection.

FIG. 5 illustrates a diagram 500 of an embodiment method for customization of application anomaly detection. In this example, abnormality thresholds are customized based on usage patterns of a resource (or a variation pattern of an abnormality parameter). FIG. 5 illustrates graphs 510 and 520 of a resource usage (e.g., energy consumption) of the same application in two different devices or users, i.e., device 1 and device 2, respectively, for a period of time. The y-axis represents usage frequency or usage histogram, and the x-axis represents the level of resource usage. In this example, the thresholds as illustrated in FIG. 4 are used for determining levels of abnormality. The same abnormality detection model is used by the two devices. In this example, two abnormality levels are used. That is, the abnormality detection model determines that the resource usage lower than T4 is normal, and resource usage greater than T4 is abnormal, as shown by line 530. It can be seen from graphs 510 and 520, that device 1 and device 2 had different usage patterns or user behaviors. The histogram of the resource usage of the two devices is different, and consequently, abnormality detection results of the two devices mean different things. The application in device 1 had the resource usage that was always less than T2 for the period of time, and thus was determined to be always normal during the period of time, while the application in device 2 had the resource usage that was greater than T4 for a noticeable percentage of time, and thus was predicted or classified as abnormal many times. In one example, based on the usage patterns, the abnormality detection model in device 1 may be instructed (e.g., by a customization mechanism as described at step 214) to use T2 (as shown by line 532), instead of T4 to detect whether the application is abnormal in the resource usage in device 1. This may be the case where the user may want to prevent suspicious application running. The abnormality detection model may be instructed by the customization mechanism to use T5 (as shown by line 534), instead of T4 to detect whether the application is abnormal in the resource usage. This may be the case where the user of device 2 determines that it is normal for device 2 and for the application to consume a large amount of the resource. The customization mechanism can increase the threshold to avoid receiving frequent abnormality detection results showing anomaly while the application is actually running normally.

Figure 6:
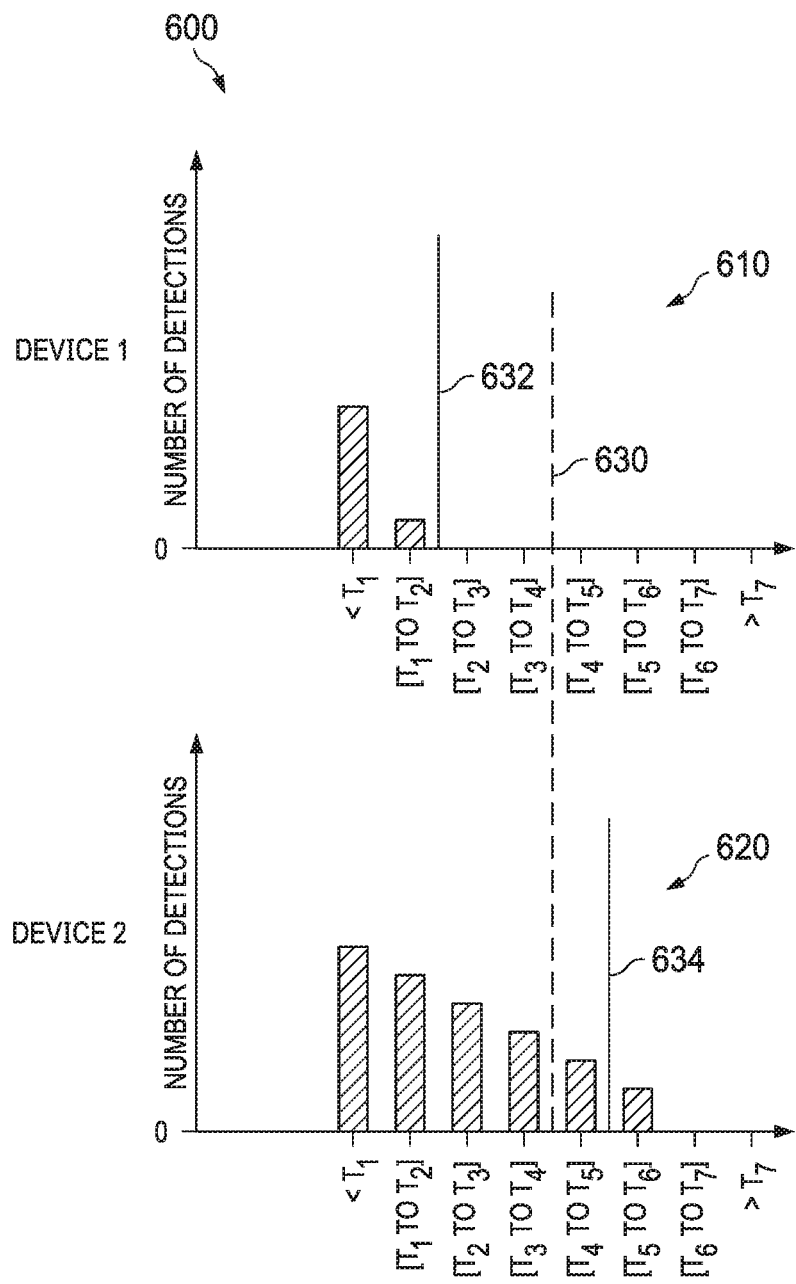
FIG. 6 illustrates a diagram of another embodiment method for customization of application anomaly detection.

FIG. 6 illustrates a diagram 600 of another embodiment method for customization of application anomaly detection. In this example, abnormality levels and/or actions may be customized based on abnormality patterns of an application with respect to an abnormality parameter. FIG. 6 illustrates graphs 610 and 620 showing the number of abnormalities detected for the same application with respect to an abnormality parameter in two devices, i.e., device 1 and device 2, respectively, for a period of time. The same abnormality detection model is used by the two devices. The x-axis represents the abnormality parameter, and y-axis represents the number of abnormalities detected. The abnormalities detected for the period of time may fall into multiple abnormality levels defined based on a set of abnormality thresholds T-T7. For example, an abnormality may be in abnormality level 1 when the abnormality parameter is less than T1, in abnormality level 2 when the abnormality parameter is between T1 and T2, in abnormality level 3 when the abnormality parameter is between T2 and T3, and so on. Thus, graph 610 and 620 show abnormality patterns of device 1 and device 2, respectively. In one example, histogram of abnormality detection results for each device may be calculated for the period of time, and used to show how often or how many times each level of abnormality were detected for the application in the respective devices. Historical data, e.g., the data recorded at step 210 of FIG. 2, may be used to determine the histogram. Assume that the abnormality detection model determines whether or not the application is abnormal based on T4, as shown by line 630, abnormality thresholds for the two devices may be adjusted based on their respective abnormality patterns. As shown, for device 1, all the abnormalities detected occur when the abnormality parameter is below T2 (i.e., only have abnormality levels 1 and 2), and no higher abnormality levels were detected during the period of time. In one example, threshold T2 (as shown by line 632) may be selected for device 1 as a threshold for detecting anomaly, where any resource usage level that exceeds T2 is considered as abnormal or unexpected for this device. Device 2, on the other hand, is a heavy resource user, and the abnormality detection model detected many instances of abnormalities in different abnormality levels. To avoid giving excessive amounts of notifications, for example, or to allow more freedom for the application and the user to use device resources, the threshold T5 (as shown by line 634), instead of T4, may be used for device 2 to detect whether the application is abnormal. An action to be taken for each abnormality level may also be adjusted based on the abnormality patterns.

Referring back to FIG. 2, at step 216, the method 200 may receive user feedback. The user feedback may include a user's instruction, indication, or selection, e.g., to take a specific action, to apply more energy saving by using a lower abnormality level or lower threshold for abnormality detection, to use a specific threshold for a level of abnormality, or to label an application using a specific level of abnormality, to allow more or less freedom for applications to use as much resource usage they want, to change how often to see notifications, to change actions based on levels of abnormality detected, or any other feedback information that may be used to detect the application anomaly and take appropriate actions. The feedback information may also be stored by the computing device at step 210. The data recorded at step 210 may provide benefits for helping improve user experience, device performance, design and development of devices, services or applications, including software and hardware components. For example, the data may be used to identify bugs or performance issues in applications or processes. The data may be used to compare performance and user experience between various device models, different versions of software components or hardware components. The data may also be used to improve design and performance of software and hardware components in current and future products, and improve user satisfaction with devices.

In some embodiments, a computing device may receive and run multiple abnormality detection models for detecting anomaly of one or multiple applications with respect to one or more abnormality parameters. Each of the multiple abnormality detection models may be built using a machine learning technique. The multiple abnormality detection models may be configured to detect anomaly of applications with respect to the same set of abnormality parameters or different set of abnormality parameters. The multiple abnormality detection models may be designed to detect abnormality of the same set of applications, or for a different set of applications in a device. The multiple abnormality detection models may use the same set of input data (e.g., resource usage, energy consumption and other relevant application and device data as described above), or may use different sets of input data to detect abnormality of one or a plurality of applications used in a device. The multiple abnormality detection models may produce different abnormality detection results for the same application with respect to the same abnormality parameter, due to the multiple abnormality detection models being designed or built differently, for example, due to random initialization when being trained using a deep neural network model, or due to using different training methods when they are being trained using machine learning.

Figure 7:
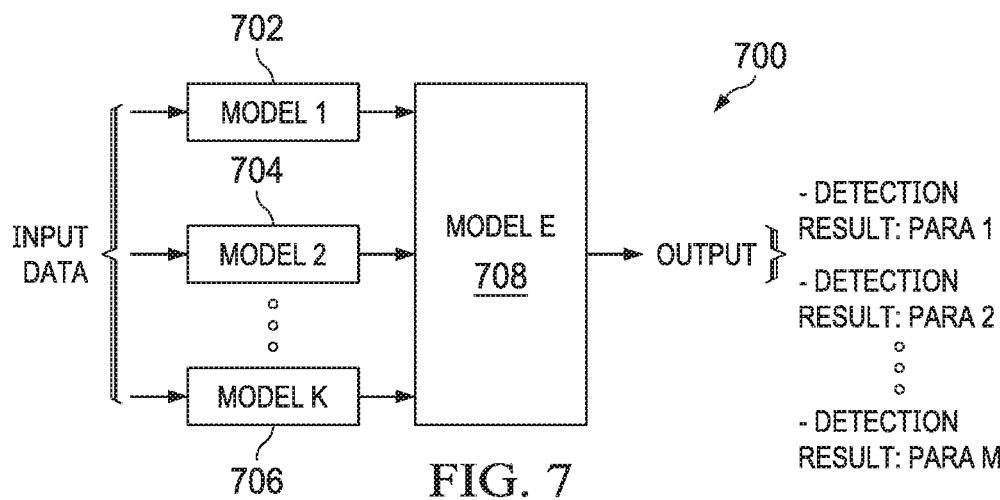
FIG. 7 illustrates a diagram of an embodiment method for application anomaly detection.

The multiple abnormality detection models may be used by the computing device to detect anomaly of one or more applications simultaneously. Multiple abnormality detection models may be used to improve the overall detection performance. FIG. 7 illustrates a diagram of an embodiment method 700 for application anomaly detection. In this example, a computing device uses multiple abnormality detection models, i.e., Model 1 (702), Model 2 (704), . . . , and Model K (706), to detect anomaly of one or more applications with respect to M abnormality parameters, i.e., para 1, para 2, . . . , para M. For example, the abnormality parameter parameters may be CPU FG energy, CPU BG energy, and a number of self-start. In some embodiments, the same input data, e.g., the resource usage and other relevant data as illustrated in FIG. 2, is input to each of Models 1-K. However, a model may only use a portion of the resource usage data for application anomaly detection. Each of the Models 1-K receives input data, and generates an abnormality detection result with respect to each of the M abnormality parameters. In one example, each of the K models may be an anomaly level detection model detecting a level of abnormality of an application. In another example, each of the three models may be an anomaly likelihood estimation model generating estimated probabilities of the application falling in a set of levels of abnormality. In yet another example, one model, e.g., Model 1, is an abnormality level detection model, and the other models are anomaly likelihood estimation models. In yet another example, Model 1 is an anomaly likelihood estimation model, and the other models are anomaly level detection models. In yet another example, all or most of models 1 to K are abnormality detection models, but each is trained using a different machine learning method or using a different training algorithm. A Model E (708) may be used to combine the abnormality detection results of the Models 1-K and generate a combined detection or estimation result for an application with respect to each of the M abnormality parameters. Model E may also be received and run by the computing device. Model E may be built using a machine learning technique. Model E may be a neural network, Bayesian network, or a majority voting model. Model E may use various methods to combine the detection results of Models 1-K, e.g., majority voting, or weighted sum, etc. For K=3 and M=2, as an illustrative example, Table 2 shows abnormality detection results of Models 1-3 and combined results of Model E for example data recorded at a point of time, or for a period of time on a device for an application. In this example, Model 1 and Model 3 are anomaly level detection models, generating detection results in three levels of abnormality, i.e., excessive usage, abnormal and highly abnormal. Model 2 is an anomaly likelihood estimation model, generating probabilities in the in the three levels of abnormality. The term "abnormality detection model" may refer to an anomaly level detection model, or an abnormality likelihood estimation model, or a combination thereof.

TABLE 2

| Model | Abnormality detection result with respect to para 1 | Abnormality detection result with respect to para 2 |
|---|---|---|
| Model 1 | Excessive usage | Highly abnormal |
| Model 2 | Excessive usage 30%, Abnormal 50%, Highly abnormal 20% | Excessive usage 10%, Abnormal 30%, Highly abnormal 60% |
| Model 3 | Abnormal | Abnormal |
| Model E (Combined result) | Abnormal | Highly abnormal |

Figure 8:
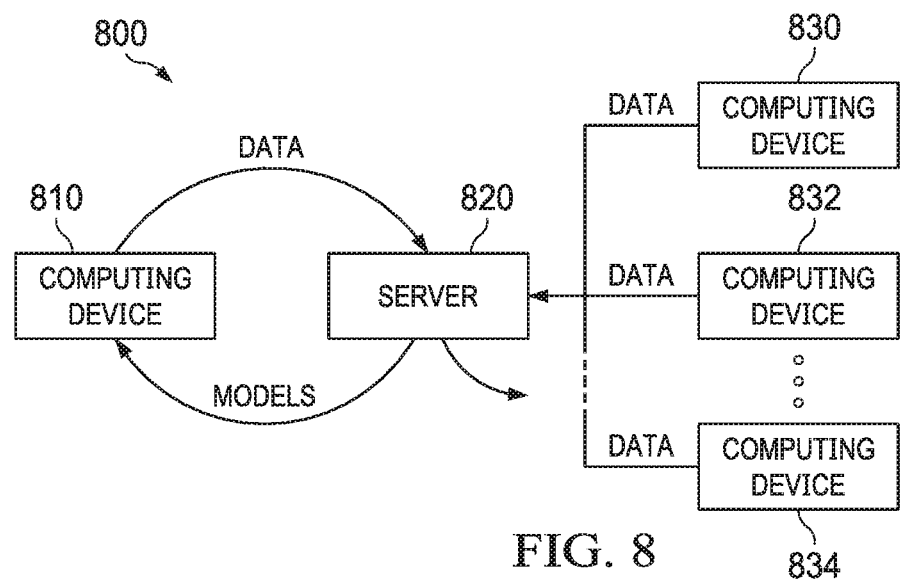
FIG. 8 illustrates a diagram of an embodiment method for interaction between computing devices and a server for application anomaly detection.

FIG. 8 illustrates a diagram of an embodiment method 800 for interaction between computing devices and a server for application anomaly detection. A computing device 810 may download or receive one or more abnormality detection models from a server 820, executes the one or more abnormality detection models and detects anomaly of one or more applications with respect to one or more abnormality parameters. The computing device 810 may perform the method 200 as illustrated in FIG. 2. The computing device 810 may send data that it has recorded for a period of time to the server 820, similar to the step 212 in FIG. 2.

The server 820 may be a local network server, a remote server or a cloud server. The server 820 is configured to collect data for building the one or more abnormality detection models from a plurality of computing devices, e.g., 830-834 and also 810. The data may be collected from a randomly selected set of devices upon users' agreement or consent, e.g., to help improve performance and user experience of a set of applications. Random selection is to protect privacy such that the users are from geographically diversified regions, uniformly distributed around the globe. Policies may be defined that selecting the users does not focus on any specific region, and no identifiable or privacy sensitive data may be collected. All data is anonymous, and user data privacy is protected and user data security is ensured. The communication or interaction between a server and a computing device may be bidirectional, to send and receive data and models. The server 820 obtains the collected data, performs analysis on the collected data, and trains the one or more abnormality detection models. The server 820 may push the one or more abnormality detection models to one or more computing devices. The server 820 may notify the one or more computing devices that an abnormality detection model is ready for downloading or upgrading. The server 820 may periodically collect the data and update the one or more abnormality detection models by training the models using the newly collected data. Thus, the one more abnormality detection models may be updated to accommodate user behavior changes or changes in environment.

Figure 9:
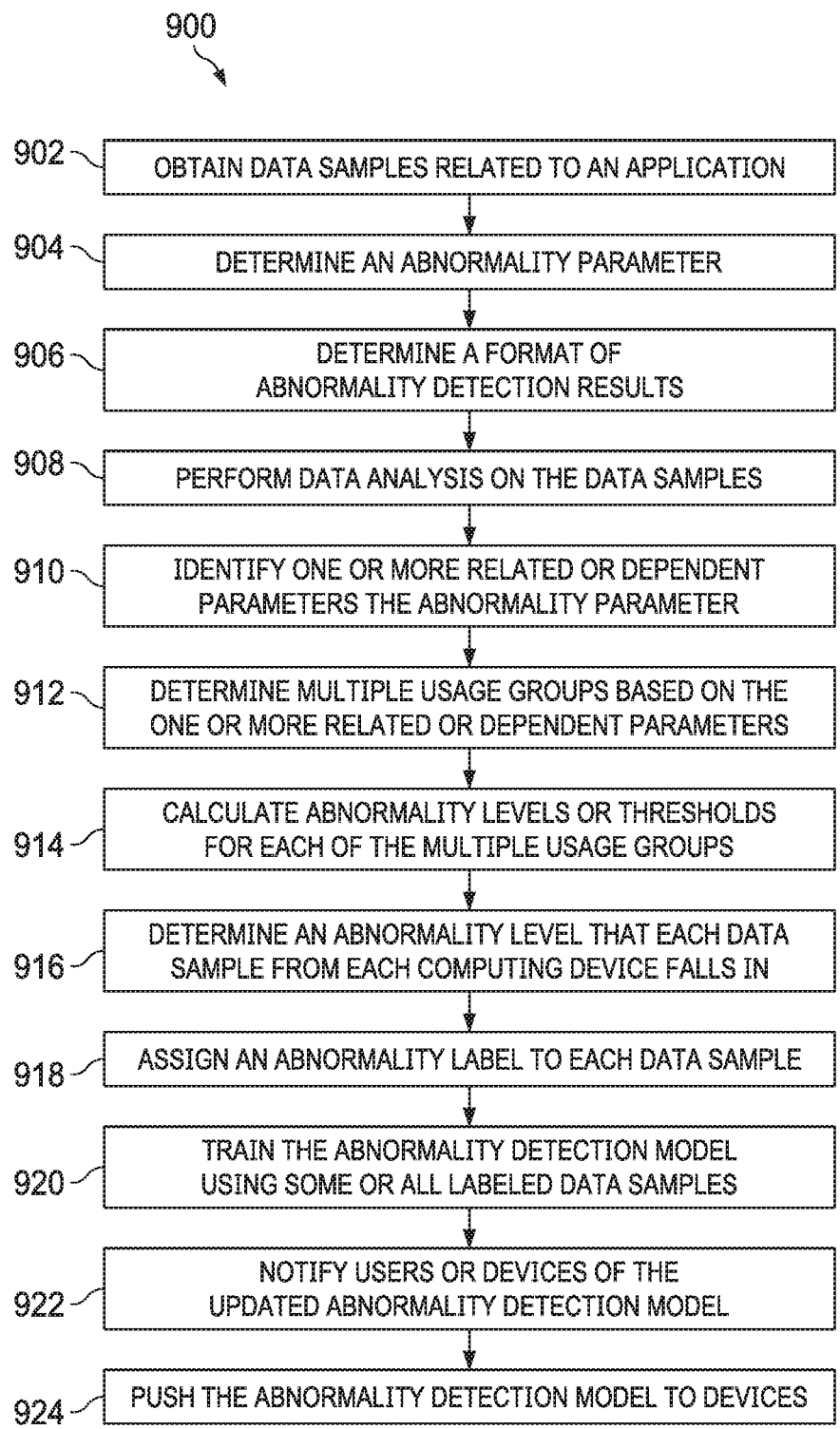
FIG. 9 illustrates a flowchart of an embodiment method for building an abnormality detection model.

FIG. 9 is a flowchart of an embodiment method 900 for building an abnormality detection model. The method 900 is indicative of operations performed by a server, such as the server 820 of FIG. 8. The method 900 is described in the following using one application and one abnormality parameter as an illustrative example. However, the method 900 may be used to build an abnormality detection model for detecting anomaly of multiple applications with respect to one or more abnormality parameters. As shown, at step 902, the method 900 obtains data samples related to an application running on a plurality of computing devices. In the case of multiple applications, the method 900 may obtain data samples related to multiple applications running on the plurality of computing devices. The data samples collected from each of the plurality of computing devices may include data sent by a computing device as described with respect to step 212 in FIG. 2. For example, the data samples collected from each of the plurality of computing devices may include resource usage data of the application, e.g., the resource usage data described with respect to FIG. 2, detection results generated for the application, e.g., obtained at step 206 in FIG. 2, actions taken on the application, e.g., actions taken at step 208 in FIG. 2, abnormality parameters of the application, e.g., CPU BG energy, CPU FG energy, wake-lock holding time, IO access rate, memory space, power consumption, etc., a usage pattern of the application, or user experience feedback, e.g., feedback received at step 216 in FIG. 2. The data samples collected from each of the plurality of computing devices may include a plurality of sets of data samples, each set of data samples may be associated with a particular time stamp.

At step 904, the method 900 determines an abnormality parameter. The abnormality parameter corresponds to a relevant resource usage of a resource accessed by the application. Method 900 may determine or select the abnormality parameter for training the abnormality detection model to detect anomaly for the application with respect to the abnormality parameter. The abnormality parameter indicates which resource of a computing device will be used to determine whether the application is running normally. The abnormality parameter may be determined based in inputs received from experts, designers or service providers etc. The abnormality parameter selection can be based on design goals, energy saving requirement, or customer requirements. Multiple abnormality parameters may be determined, each of which is used for anomaly detection of the one or more applications. The abnormality parameter may be a combination parameter or an attribute or a quantitative feature calculated from some form of combining or performing a mathematical operation over several resource usage parameters. For example, an abnormality parameter may be a weighted sum of Wi-Fi BG usage, modem BG usage and Bluetooth BG usage. As another example, the abnormality parameter could be a weighted sum of rear-camera usage, front-camera usage and multi-media usage.

At step 906, the method 900 determines a format of abnormality detection results to be produced with respect to the determined abnormality parameter. For example, an abnormality detection result may be in a format of indicating whether the application is normal or abnormal. In another example, an abnormality detection result may be in a format of indicating whether the application has anomaly that is in one of a set of abnormality levels. In another example, an abnormality detection result may be in a format of indicating probabilities of the application being in a set of abnormality levels. The set of abnormality levels may include the levels of abnormality as described with respect to FIG. 4. The method 900 may also determine to use a combined format. For example, the method 900 may determine to detect whether the application has anomaly with respect to CPU FG energy consumption that is in one of a set of abnormality levels, and also estimate probabilities of the application falling in the set of abnormality levels. For different abnormality parameters, the format of abnormality detection results or abnormality levels may be different. The format of abnormality detection results or abnormality levels or abnormality classes may be determined by experts, designers or service providers, based on expertise and experiences, design goals, energy saving requirement, or customer requirements.

Figure 10:
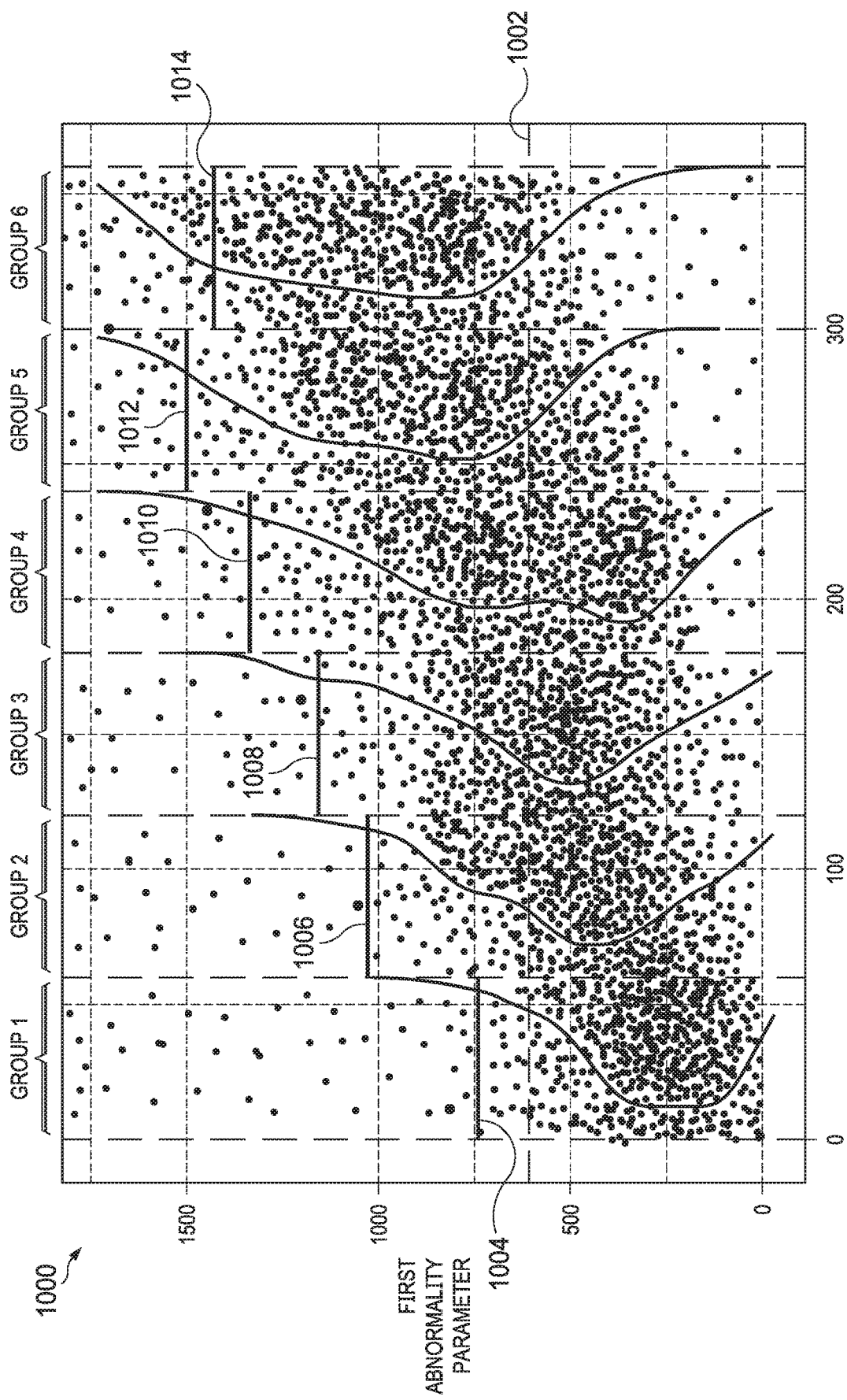
FIG. 10 illustrates a graph showing embodiment usage groups defined based on a related usage parameter of an abnormality parameter.

At step 908, the method 900 performs data analysis on the data samples collected. The data analysis performed on the data samples may be used to identify one or more parameters that are related to or dependent on the abnormality parameter. Different resource usages may be related to or dependent on each other. Thus, anomaly in a first resource usage may need to be determined by considering a second related or dependent resource usage. A related or dependent parameter to an abnormality parameter may also be referred to as a usage parameter. FIG. 10 illustrates a graph 1000 showing relationship between a first abnormality parameter and a related resource usage parameter or attribute (referred to as a related parameter for illustration purposes). The relationship is shown based on data samples collected from a plurality of user devices and associated with an application. Each dot (or filled small circle) in FIG. 10 indicates one computing device or one usage data sample. The x-axis represents the related parameter (i.e., related resource usage parameter or attribute) that is highly related to or dependent on the first abnormality parameter, and the y-axis represents the first abnormality parameter. As shown, there is a significant correlation between the related parameter and the first abnormality parameter. The first abnormality parameter (which may be a resource usage) increases as the related parameter increases. As an example, related parameter (x axis) may be a parameter indicating an the amount of active or voluntary resource usage, which is chosen to be used by user or device, while the first abnormality parameter (y axis) may be viewed as the amount of discretionary resource usage, which is somehow related or caused by the active usage of a resource by the user.

Anomaly in the application according to the first abnormality parameter, which may be a resource usage such as CPU BG usage, is determined by checking whether the first abnormality parameter exceeds a fixed threshold, as shown by line 1002. If the first abnormality parameter exceeds the threshold, then the application is determined to be abnormal in the first abnormality parameter. However, in some cases, a greater value of the first abnormality parameter of the application may be normal because it is caused by a greater value of a related resource usage parameter of the application. In this case, the application should not be determined to have anomaly when the value of the related resource usage parameter is high.

In one embodiment, values of the highly related or dependent resource usage parameter (x-axis in FIG. 10) of the plurality of computing devices may be analyzed, and categorized into several usage groups, e.g., 1 to 6. Each of the groups 1-6 corresponds to a range of values of the related resource usage parameter. The plurality of computing devices is then categorized into usage groups based on their values of the resource usage parameter which is highly related or dependent to the first abnormality parameter. Values of related resource usage parameter used by an application on a computing device may be generated using data samples collected from the computing device. One or more abnormality thresholds may then be calculated specifically for each usage group, based on related resource usage parameter in each group. When considering only one abnormality level (meaning that it can identify normal vs abnormal usage), lines 1004-1014 show thresholds calculated for groups 1-6, respectively, in the example shown in FIG. 10, based on a statistical anomaly analysis, abnormality assessment or an abnormality detection criterion, or using expert knowledge, or using application logs or system logs. Table 3 below shows six thresholds (T1,1) to (T1,6) calculated for groups 1-6. (T1, i) indicates a threshold T1 for group i. The thresholds are calculated considering the impact of the related resource usage parameter in the respective groups. With the abnormality thresholds determined, when determining whether an application on a computing device has anomaly with respect to the first abnormality parameter, the computing device may first be categorized into a group of the groups 1-6 based on its associated related resource usage parameter, and a threshold for the group is then identified and compared with the first abnormality parameter of the application. If the first abnormality parameter of the application exceeds the identified threshold, the application is determined to have anomaly in the first abnormality parameter. By categorizing computing devices into different usage groups and using group specific thresholds, fault or mistake in anomaly detection may be reduced or avoided. The usage groups categorized based on each usage parameter may be updated or redefined, and corresponding thresholds may be re-calculated based on newly collected data samples.

TABLE 3

|  | Group | | | | | |
|---|---|---|---|---|---|---|
|  | G1 | G2 | G3 | G4 | G5 | G6 |
| Threshold | T1, 1 | T1, 2 | T1, 3 | T1, 4 | T1, 5 | T1, 6 |

In some embodiments, dependency relationship between an abnormality parameter and multiple related resource usage parameters may be established or identified. Multiple groups may be defined based on each of the multiple related or dependent parameters. In this case, thresholds may be calculated taking into consideration of groups defined based on combination of some or all of the multiple related or dependent parameters. For example, an abnormality parameter is identified to be dependent on two different resource usage parameters, i.e., para 1, and para 2. Examples of para 1, and para 2 may include on-screen time, Wi-Fi locking time, audio usage time, and multimedia usage time. For example, based on data analysis of collected data samples, four groups are defined based on para 1, and two groups are defined based on para 2. The groups for each usage parameter may be defined similarly to those discussed above with respect to FIG. 10. Thresholds may then be calculated considering situations of a computing device falling into various possible combinations of the groups defined based on all of the related parameters. Table 4 shows example thresholds calculated for this case. In Table 4, Gki represent the i-th group defined based on para k, where k=1, 2, and i=1, 2, 3, 4. Eight thresholds, i.e., (T1,1) to (T1,8) are determined corresponding to each combination of groups. For example, when a computing device falls into a combination of G11 and G21 based on para 1 and para 2, threshold (T1,1) is used to compare with the abnormality parameter, to determine whether the application has anomaly in the abnormality parameter. When a computing device falls into a combination of G13 and G22 based on para 1 and 2, threshold T1,6 is used. In some embodiments, computing devices falling into the same combination of groups may be categorized into one combination group. As shown in Table 4, computing devices falling into a combination of G11 and G21 is categorized as a combination group CG1, falling into a combination of G11 and G22 is categorized as CG2, falling into a combination of G12 and G21 is categorized into CG3, and so on. Thus, based on the two related or dependent resource usage parameters para 1 and 2 of this example, eight combination groups, i.e., CG1 to CG8, may be defined, and each combination group corresponds to a threshold (T1,1) to (T1,8), respectively. In a case when only one single related or dependent parameter is identified for the abnormality parameter, the combination groups resulted will be the same as the groups categorized based on the single related or dependent parameter. A combination group may also be referred to as a usage group in the disclosure, since anomaly is detected based on the usage group with a corresponding threshold.

TABLE 4

| | Combination group | | | | | | | |
|---|---|---|---|---|---|---|---|---|
| | CG1 | CG2 | CG3 | CG4 | CG5 | CG6 | CG7 | CG8 |
| Para 1 | G11 | G11 | G12 | G12 | G13 | G13 | G14 | G14 |
| Para 2 | G21 | G22 | G21 | G22 | G21 | G22 | G21 | G22 |
| Thresholds | T1, 1 | T1, 2 | T1, 3 | T1, 4 | T1, 5 | T1, 6 | T1, 7 | T1, 8 |

Figure 11:
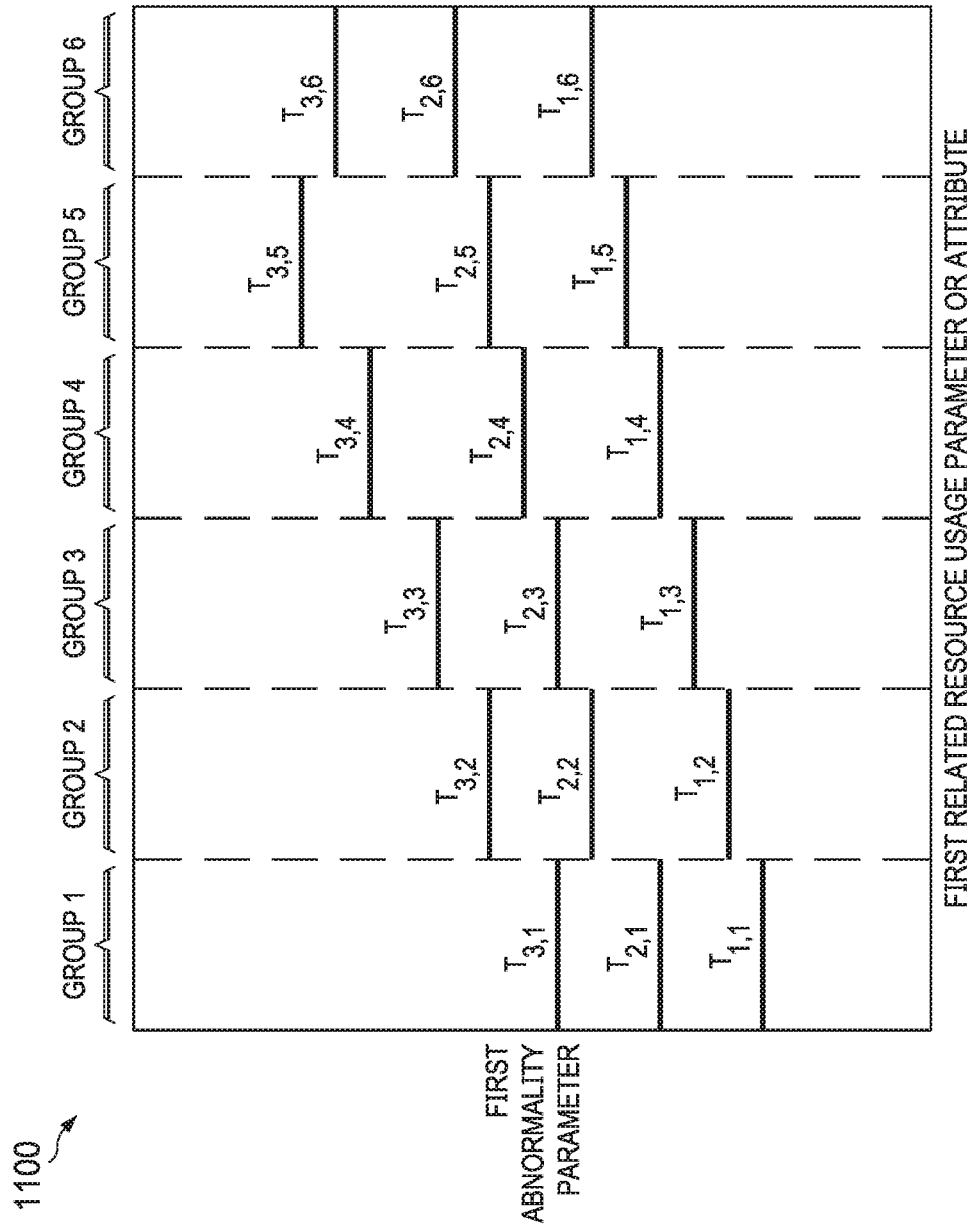
FIG. 11 illustrated a diagram showing multiple abnormality levels or thresholds defined for each usage group illustrated in FIG. 10.

In some embodiments, instead of using a single abnormality threshold for each usage group as explained for FIG. 10, multiple abnormality levels, multiple abnormality classes or multiple abnormality thresholds may be identified for each usage group. As an example, FIG. 11, illustrates the case when there are 3 abnormality thresholds, which may translate to having four abnormality classes (e.g., normal, excessive usage, abnormal, highly abnormal). In FIG. 11, Ti,j represents a threshold Ti for a usage group j, where i=1, 2, 3, and j=1, 2, . . . , 6. A "normal" class in usage group 1 means that the value of the abnormality parameter is less than the threshold (T1,1), when the related resource usage parameter belongs to group 1. For usage group 1, "highly abnormal" means that the value of the abnormality parameter is above the threshold (T3,1), and so on.

Thus, referring back to FIG. 9, based on the data analysis performed at step 908, the method 900, at step 910, identifies one or more related or dependent parameters to the abnormality parameter. At step 912, the method 900 determines multiple usage groups based on the one or more related or dependent parameters. At step 914, the method 900 calculates abnormality levels or thresholds for each of the multiple usage groups. This may be done based on statistical analysis and an abnormality assessment algorithm. The method 900 may, when considering detection of multiple abnormality levels, identify multiple thresholds instead of one threshold for each usage group, as described in FIG. 11. At step 916, the method 900 determines an abnormality level that each data sample from each computing device fall in with respect to the abnormality parameter. This is determined based on data samples collected from the corresponding computing device and using thresholds generated corresponding to a plurality of combination groups. For example, the method 900 determines which combination group a computing device belongs to, e.g., CG4 in Table 4, and compares a value of the abnormality parameter of the application on the computing device with a threshold corresponding to the determined combination group, i.e., (T1, 4). The method 900 then generates abnormality detection results corresponding to the data samples of the corresponding computing device. For example, if data samples collected from a computing device includes 6 sets of data samples recorded by the computing device at different time, and each set of data samples includes data as stored in FIG. 2, the method may generate 6 abnormality detection results, as shown in Table 5 as an example. Each data sample has a corresponding abnormality detection result indicating which abnormality class each sample belongs to.

TABLE 5

| | Data sample identifier | | | | | |
|---|---|---|---|---|---|---|
| | 1 | 2 | 3 | 4 | 5 | 6 |
| Detection result | Normal | Excessive usage | Normal | Abnormal | Abnormal | Highly abnormal |

The method 900 may generate abnormality class or level for each of data samples of each of the plurality of computing devices or for a portion of the computing devices. The generated class or level may be referred to as a reference abnormality class or level. With the reference abnormality class or levels generated, at step 918, the method 900 assigns an abnormality label to each data sample. An abnormality label assigned to a data sample indicates an abnormality class or level corresponding to the data sample. Using Table 5 as an example, data sample 1 may be assigned a label of "normal", data sample 2 may be assigned a label of "Excessive usage", data sample 3 may be assigned a label of "normal", data samples 4 and 5 may be assigned a label of "abnormal", respectively, and data sample 6 may be assigned a label of "highly abnormal". In this way, all or a portion of data samples collected may be labeled. At step 920, the method 900 trains the abnormality detection model using some or all of the labeled data samples. The abnormality detection model may be trained using a machine learning technique that is applicable and efficient for this task. For example, the abnormality detection model may be an artificial neural network, a deep neural network, or a Bayesian network, and so on. At step 922, the method 900 may notify users or devices of the updated abnormality detection model. The method 900 may notify that the abnormality detection model is ready for downloading or upgrading. At step 924, the method 900 may push the abnormality detection model to devices.

The method 900 may collect a large amount of data samples to train one or more abnormality detection models. The method 900 may be used to build the abnormality detection model for detecting anomaly of a plurality of applications based on a plurality of abnormality parameters. The method 900 can obtain data samples related to the plurality of applications running on a plurality of computing devices, and for each application, the steps 904-920 of the method 900 may be performed. Then, labeled data of the combination of applications and abnormality parameters are used to build one or more abnormality detection models that are capable of detecting abnormality at once for a plurality of applications and a plurality of abnormality parameters or prediction outputs.

Figure 12:
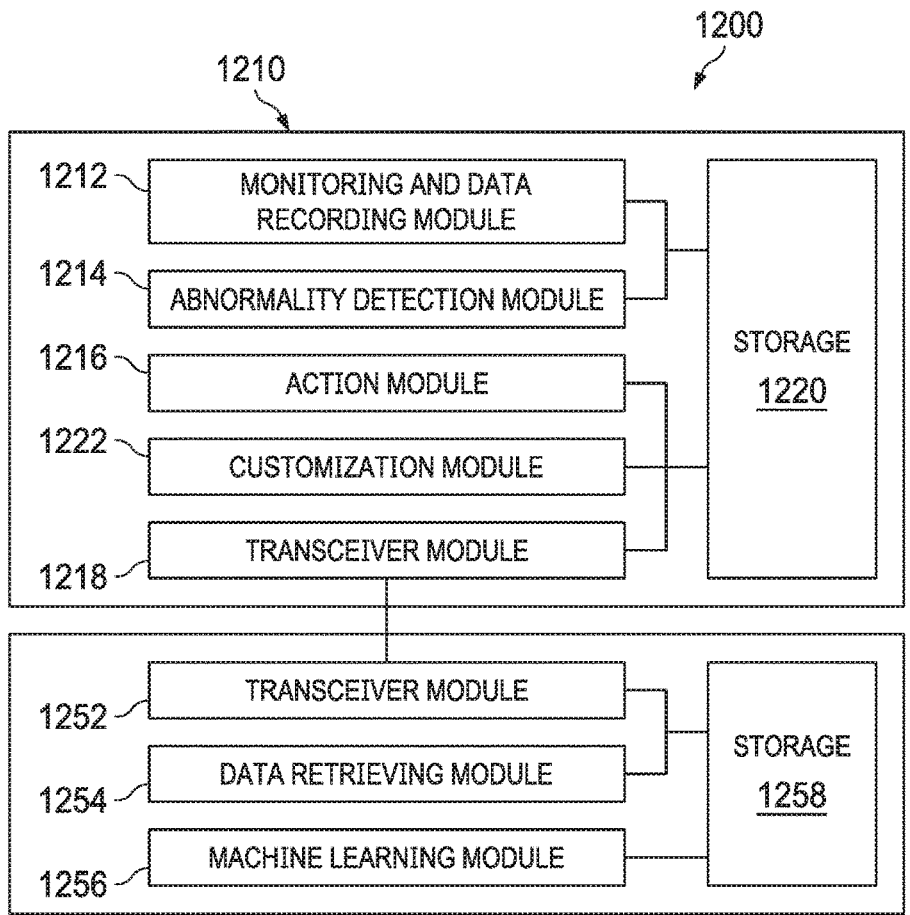
FIG. 12 illustrates a block diagram of an embodiment system for application anomaly detection.

FIG. 12 illustrates a block diagram of an embodiment system 1200 for application anomaly detection. As shown, the embodiment system 1200 includes a computing device 1210 and a server 1250. The computing device 1210 includes a monitoring and data recording module 1212, an abnormality detection module 1214, an action module 1216, a transceiver module 1218, a storage or memory 1220, and a customization or device adaptation module 1222. The server 1250 includes a transceiver module 1252, a data retrieving and data analysis module 1254, a machine learning module 1256 and a storage module 1258.

The monitoring module 1212 may be configured to monitor resource usages of an application during running or execution of the application on the computing device 1210, and obtain and collect resource usage data of the application as well as other relevant device and environmental data. The data obtained by the monitoring module 1212 may be stored in the storage 1220. The abnormality detection module 1214 may be configured to detect abnormality of one or more applications running on the computing device 1210 using one or more abnormality detection models, e.g., using the embodiment method as illustrated in FIG. 2 or 7. The action module 1216 may be configured to take an action in response to a result of the abnormality detection module 1214, e.g., performs the step 208 in FIG. 2. The action module 1216 may retrieve actions from the storage 1220, and record an action taken in the storage 1220 corresponding to an abnormality detection result. The transceiver module 1218 may be configured to retrieve data stored in the storage 1220, send the data to the server 1250, and receive one or more abnormality detection models from the server 1250. The customization module 1222 may be configured to perform step 214 in FIG. 2, and adjust criteria used by 1216 to take actions, as discussed above with respect to FIGS. 4-6.

The transceiver module 1252 may be configured to retrieve one or more abnormality detection models from the storage 1258, and send the one or more abnormality detection models to the computing device 1210 and other computing devices. The transceiver module 1252 may also be configured to receive data from the computing device 1210 and other computing devices, and store the received data to the storage 1258. The data retrieving module 1254 is configured to retrieve data from the storage 1258 for the machine learning module 1256 to build or train the one or more abnormality detection models. The machine learning module 1256 may be configured to perform the steps of 908-920 and build the one or more abnormality detection models, and store the designed or built abnormality detection models in the storage 1258. The server 1250 may be connected to a plurality of computing devices, receive related data from the plurality of computing devices, and build the one or more abnormality detection models using the received data from the plurality of computing devices.

In some embodiments, the abnormality detection module 1214 may not be entirely executed in the device, and instead, the resource usage and other relevant data may be sent to a local computing server or a remote computing server to perform the abnormality detection. This means that the device may not have the module 1214, and the abnormality detection task may be performed outside of the device, and then the detection results are sent back to the device. The device may then take action in response to the abnormality level detected for each application used by the device. In another embodiment, the abnormality detection module 1214 may be divided into two parts. A first part, for example, including attribute or usage resource parameter extraction, data analysis, and preprocessing, may be performed inside the device, and the rest of the abnormality detection process may be performed on a local or remote computing server or a support device, and then the abnormality detection results are sent back to the device.

Figure 13:
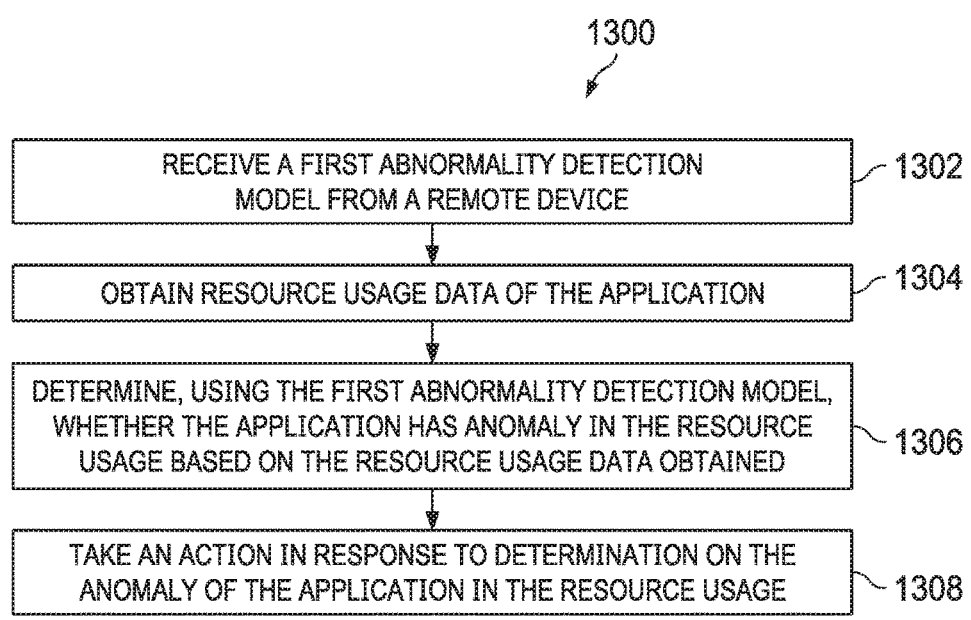
FIG. 13 illustrates a flowchart of an embodiment method for application anomaly detection.

FIG. 13 illustrates a flowchart of an embodiment method 1300 for application anomaly detection. Method 1300 may be indicative of operations performed at a user device. As shown, at step 1302, the method 1300 receives a first abnormality detection model from a remote device. The first abnormality detection model is trainable using a machine learning technique for detecting anomaly of an application with respect to a resource usage. At step 1304, the method 1300 obtains resource usage data of the application. The resource usage data may be obtained according to the first abnormality detection model. The resource usage data includes relevant device and environmental data and information about usage or energy consumption of one or more hardware components or one or more services accessed by the application on the computing device. At step 1306, the method 1300 determines, using the first abnormality detection model, whether the application has anomaly in the resource usage based on the resource usage data obtained. At step 1308, the method 1300 takes an action in response to determination on the anomaly of the application with respect to the resource usage.

Figure 14:
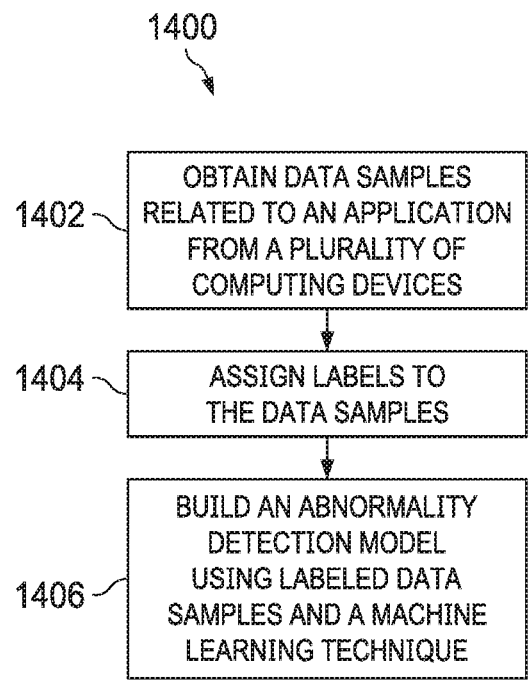
FIG. 14 illustrates a flowchart of an embodiment method for building an abnormality detection model.

FIG. 14 illustrates a flowchart of an embodiment method 1400 for building an abnormality detection model. The method 1400 may be indicative of operations at a remote device, such as a local computing server, remote server or a cloud server. As shown, at step 1402, the method 1400 obtains data samples related to an application from a plurality of computing devices. The data samples may include information about usage or energy consumption of one or more hardware components or one or more services accessed by the application on the plurality of computing devices, as well as other relevant device and environmental data. Each data sample may be associated with one of the plurality of computing devices. At step 1404, the method 1400 assigns labels to the data samples. A label assigned to a data sample associated with a respective computing device indicates an abnormality level in a plurality of abnormality levels that the application has in a first resource usage on the respective computing device. At step 1406, the method 1400 builds an abnormality detection model using labeled data samples and a machine learning technique. The abnormality detection model is configured to detect anomaly of the application in the first resource usage.

The first resource usage (or parameter, attribute or quantitative parameter) may be determined, with respect to which anomaly of the application is detected. The first resource usage corresponds to a first abnormality parameter or attribute. The set of abnormality levels may be determined to indicate levels of the anomaly of the application in the first resource usage. For each of the plurality of computing devices, whether the application has anomaly in the first resource usage may be detected or determined based on data samples of the respective computing devices. Thus, a plurality of abnormality assessment (or detection) results for the data samples of the plurality of computing devices may be generated, and each of the plurality of abnormality assessment results indicates an abnormality level in the set of abnormality levels. Then the data samples may be labeled with the corresponding abnormality levels based on the assessment results.

Anomaly of the application may be determined using a method as discussed at step 912-916 in FIG. 9. In some embodiments, other methods may also be used to determine anomaly of an application based on the analysis of the collected data samples. For example, an abnormality assessment and data analytics method, such as a density or distribution-based method, a distance-based method, a clustering based method, a similarity based method, a machine learning based method, or a method based on reconstruction error may be used to assess abnormality levels of data samples. For the data samples associated with one application, each of the data samples may then be assigned with a corresponding abnormality label for each attribute or resource usage of concern. In another embodiment, instead of assigning a set of labels or abnormality levels to data samples, a continuous abnormality or usage severity value is assigned to each data sample, which then is used to train the model for estimating or predicting the resource usage and abnormality level. In some embodiments, instead of using statistical analysis, abnormality assessment and data analytics on large amount of data collected from a plurality of devices, performance logs, usage logs, incident reporting or user experience feedback may be used to determine whether an application has anomaly in a resource usage. In addition, an expert may assess collected data samples and records, based on his/her experience, insight and knowledge, to determine whether an application anomaly has occurred in a device.

Figure 15:
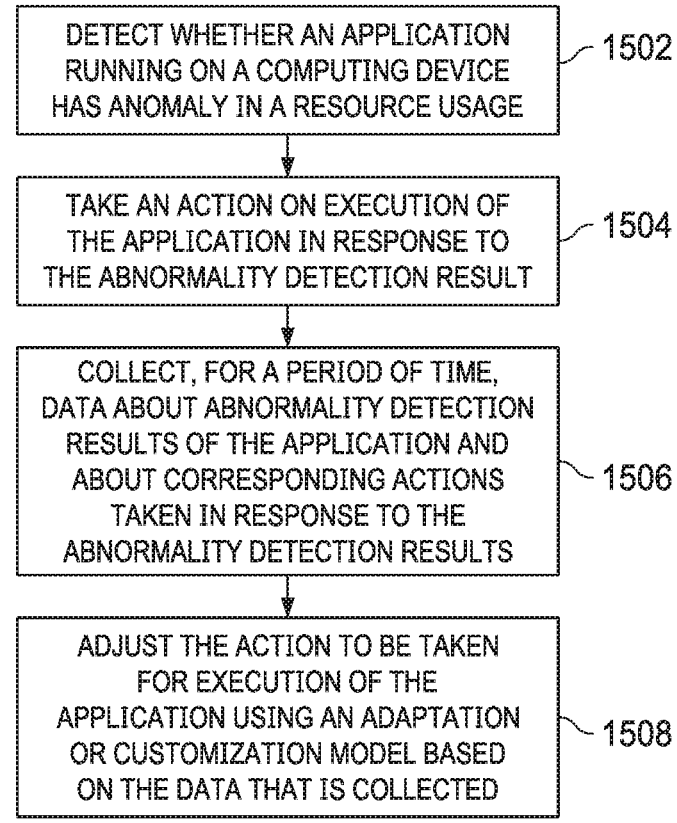
FIG. 15 illustrates a flowchart of another embodiment method for application anomaly detection.

FIG. 15 illustrates a flowchart of another embodiment method 1500 for application anomaly detection. As shown, at step 1502, the method 1500 detects whether an application running on a computing device has anomaly in a resource usage. The anomaly of the application may be detected based on resource usage data obtained for the application and using an abnormality detection model that is built using a machine learning technique. The method 1500 may detect whether the application has anomaly in a plurality of abnormality and usage levels. An abnormality detection result for the application may then be generated, which may include detection of one or more abnormality levels and the likelihood of each level. At step 1504, the method 1500 takes an action on execution of the application in response to the abnormality detection result. At step 1506, the method 1500 collects, for a period of time, data about abnormality detection results of the application and about corresponding actions taken in response to the abnormality detection results. At step 1508, the method 1500 adjusts the action to be taken in response to the abnormality detection result using an adaptation or customization model based on the data that is collected. This may help improve user experience or performance of the computing device.

Embodiments of the present disclosure help improve user experience by reducing excessive energy consumption caused by applications running abnormally in a computing device. The embodiments become more useful for computing devices, which are battery-operated and therefore the energy source is limited in capacity. If an application, a process, a tool or a software, works abnormally in a device for a period of time, it causes battery to be drained faster than it normally should, and therefore may cause the user of the device to be unsatisfied with the performance and efficiency of the device. The abnormality is detected using data collected from analysis of usage of hardware components, services and resources by the application. If the abnormality in energy consumption or resource usage by an application occurs for a period of time, it may cause an excessive increase in temperature of the device, which may cause damage to the device or their components, or degrade the performance of the device or its components. Therefore, abnormality detection of the embodiments may also prevent excessive heating or thermal issues of the device. Embodiments of the present disclosure may also detect cases or events where an application or processes abnormally uses a resource, a component or a service in a computing device, and this helps prevent the application from degrading the overall performance of the device or the overall user experience. When a resource is used abnormally, it may degrade the performance of the resource as it is allocated to other applications or to system processes, and as a result, the device may function with reduced performance. Embodiments of the present disclosure improve user experience, improve performance, improve battery life, reduce overall energy consumption, reduce excessive heat or thermal issues, and help provide a more normal and efficient utilization of resources, e.g., software or hardware components available in a computing device.

Figure 16:
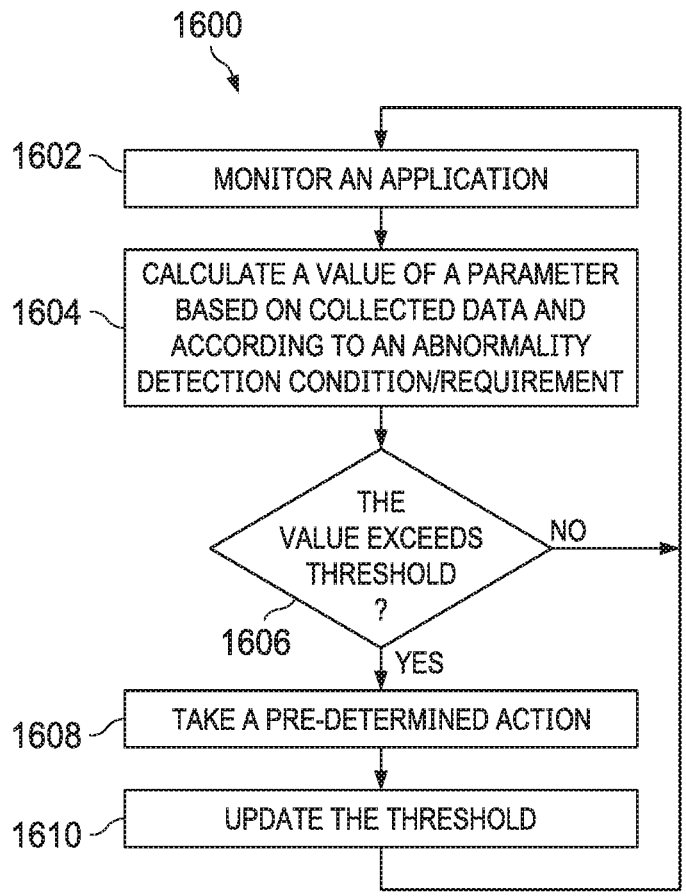
FIG. 16 illustrates a flowchart of an embodiment method for application anomaly detection.

FIG. 16 illustrates a flowchart of an embodiment method 1600 for abnormality detection of an application running on a computing device. The method 1600 detects abnormality of the application while the application is running based on data collected during execution of the application, realizing real-time application abnormality detection. As shown, at step 1602, the method 1600 monitors the application that is running on the computing device. In some embodiments, monitoring the application includes monitoring usages of resources used or accessed, directly or indirectly, by the application, such as usage of one or more hardware, one or more services, one or more software components, or one or more resources accessed by the application during running or execution of the application. Usage of hardware may include a pattern that the hardware is accessed or used, such as access duration, access rate, access starting time and ending time, etc. The method 1600 may obtain, e.g., collect or receive, data related to usage of the one or more hardware by the application. The data related to usage of the one or more hardware, in some embodiments, may include foreground usage of CPU, background usage of CPU, wake-lock holding time, number of self-start, on-screen time of the application, cellular usage and pattern (e.g., including foreground, and/or background cellular usage, and/or reception quality), Wi-Fi usage and pattern (e.g., including foreground, and/or background Wi-Fi usage, and/or reception quality), memory usage, input-output (IO) device usage, or location service usage (e.g., a number of location services used), or any combination thereof. In some embodiments, the data related to usage of the one or more hardware may also include usage of a GPU (e.g., including foreground and/or background GPU usage), a number of notifications of arrival, version information, usage of audio services (e.g., foreground and/or background audio usage), or a number of access to user-data, or any combination thereof. The data related to usage of the one or more hardware will be used to detect abnormality of the execution of the application. One of ordinary skill in the art would recognize that the examples related to usage of the one or more hardware given here are merely for illustration purposes, and any data related to usage of hardware would be applicable in the embodiment methods.

Taking a social networking application named "Whatsapp" installed in a smartphone as an example, a hard disk of the smartphone may be accessed for playing music stored in the hard disk, a memory cache may be used to temporarily store data of the music for playback, a screen of the smartphone may be accessed to display the playback of the music, and a speaker may be accessed for playing the music. The method 1600 may monitor the usage of these hardware by Whatsapp, i.e., the hard disk, memory, screen and speaker, and collect usage data accordingly. For example, the usage data may include screen display duration, speaker-on duration, a size of the cache used for playback, a number of accesses to the hard disk. The data may also include power (e.g., battery power) consumed by execution of Whatsapp. The data may also include energy consumed by display for a period of time during execution of Whatsapp, energy consumed by CPU for a period of time during execution of Whatsapp, etc. In one example, when Whatsapp plays a song online through Wi-Fi, the method 1600 may also monitor usage of, e.g., a wireless interface, and obtains data about usage of the Wi-Fi interface, e.g., Wi-Fi lock holding time.

In some embodiments, the method 1600 may associate the obtained data related to usage of the one or more hardware with the application. This is beneficial for some cases, where data related to usage of hardware accessed by the application is generated actually by an entity different from the application, such as a different process in the computing device, or an operating system of the computing device, but contributor of the usage, i.e., the application, is not identified. In the example of Whatsapp for music playback, an audio server or a media manager in the smartphone is actually activated to deliver streaming audio for Whatsapp and consumes energy. If the audio server has consumed x amount of energy due to Whatsapp's music playback, the x amount of energy may be recorded for the operations of the audio server, but is not associated with Whatsapp, who is actually the source contributor of the energy consumed. Association of the obtained data related to usage of the one or more hardware with the source contributor of the data, i.e., the application, helps identify the usage data associated with running of the application, which will be used to determine abnormality of the application. When the application has different versions, the association may include information identifying the version of the application.

With the obtained data, the method 1600 may detect whether the application is running abnormally, or whether abnormality occurs to the application. The method 1600 may monitor usage of the hardware, services or other resources by the application for a period of time, obtain the related data, and periodically detect whether abnormality occurs. Whether abnormality occurs or not may be detected according to various abnormality detection conditions or requirements. An abnormality detection condition or requirement may trigger or initiate detection operation of application abnormality. For example, an application may be determined to have abnormality when a memory space it occupies exceeds a threshold. The requirement or condition in this case is thus the memory space exceeding a threshold. In another example, the application may be determined to have abnormality when it consumes more than a threshold amount of power. The requirement or condition in this case is thus power consumption exceeding a threshold or limit. In yet another example, the application may be determined to be in an abnormal state when its Wi-Fi lock duration exceeds a threshold. The requirement or condition in this case is thus Wi-Fi lock duration. Examples of an abnormality detection requirement or condition include memory space, Wi-Fi lock holding time, power, IO access, CPU usage, GPU usage, wake-lock holding time, etc. Throughout the disclosure, the terms of "abnormality detection condition" and "abnormality detection requirement" are used interchangeably. In one embodiment, abnormality of an application may be detected when a single abnormality detection condition is satisfied. In another embodiment, abnormality of an application may be detected when multiple abnormality detection conditions or requirements are satisfied. Different abnormality detection conditions may be combined and used to determine abnormality of an application. An abnormality detection condition or requirement may also be understood to correspond to a parameter, such as memory space size, power consumption amount, or Wi-Fi lock duration, that is used to determine abnormality of an application. The parameter indicates usage of hardware accessed by the application during execution of the application. Abnormality of an application is detected according to the parameter indicated by the abnormality detection condition. Examples of the parameter may include an average size of a memory space, an access rate of an IO device, average wake-lock holding time, average Wi-Fi lock holding time, GPU service time, CPU service time, an average amount of energy, or CPU background running time. Those of ordinary skill in the art would recognize various abnormality detection requirements and parameters that are applicable in the embodiment methods.

As shown in FIG. 16, at step 1604, according to an abnormality detection condition, the method 1600 calculates, based on the data related to the usage of the one or more hardware, a value corresponding to a parameter indicated by the abnormality detection condition. In some embodiments, the method 1600 may establish (or configure) a set of models, and each of the set of models is corresponding to an abnormality detection condition. Each of the models takes the obtained data related to the usage of the one or more hardware as input, and generates a value, as an output, corresponding to a parameter indicated by the abnormality detection condition. These models may also be combined into one single model that can generate parameter values corresponding to different abnormality detection conditions. In this case, the single model may take, as input, the obtained data related to the usage of the one or more hardware or services, and as well as an indication indicating which of the abnormality detection conditions is used for calculating a value as an output. A model may be a mathematical model pre-determined for application abnormality detection. For example, a mathematical model may calculate a value of a parameter according to a formula of $$\omega 0 + \omega 1 * Tx + \omega 2 * Rx + \omega 3 * carrier + \omega 4 * RAT + \omega 5 * f + \omega 6 * MIMO + \omega 7 * CA + \omega 8 * S + \omega 9 * mobility + \omega 10 * location$$

where ω1 is a coefficient trained using a machine learning technique, "Tx" is an amount of uploaded data, "Rx" is an amount of downloaded data, "carrier" refers to a service provider, "RAT" is a radio technology used, "f" is a radio channel used, "MIMO" indicates whether MIMO mode is enabled, "CA" is the carrier aggregation status, "S" is signal strength, "mobility" indicates a device's movement, and "location" indicates a device's servicing cell tower. In another embodiment, the mathematical model for application abnormality detection may be a more complex or complicated multi-stage or multi-level model, such as a deep neural network or a Bayesian estimation network that uses a larger set of input data collected, various combinations of input data, or various secondary or higher-level attributes or quantitative features to estimate an abnormality parameter or to detect an abnormality condition for one or more applications.

At step 1606, the method determines whether the calculated value of the parameter exceeds a threshold corresponding to the abnormality detection condition/requirement. For example, when the value is corresponding to a parameter of power consumption, the threshold may be a power threshold. In another example, when the value is corresponding to a parameter of CPU service time duration, the threshold may be a time duration threshold. In yet another example, when the value is corresponding to a parameter of IO access rate, the threshold is an access rate threshold. The computing device may maintain a list of thresholds corresponding to different abnormality detection conditions/requirements, e.g., in a table. If there is no threshold defined corresponding to the abnormality detection condition/requirement or for the application, the method 1600 may stop here without proceeding to any succeeding steps.

At step 1608, when the calculated value exceeds a threshold, the method 1600 determines that an abnormality occurs to the application, and takes an action in response. An action may be taken so that negative impact of the application's abnormality is reduced or avoided. In one example, an action is taken to freeze running of the application. In another example, an action is taken to kill the application. In yet another example, a notification, e.g., an abnormality notification, may be indicated to a user of the computing device. The notification may indicate the occurrence of the abnormality, so that the user may take an action that he or she deems appropriate in response. The notification may indicate the calculated value and the threshold used for determining the abnormality. The notification may also indicate a list of actions that the user can choose in response to the occurrence of the abnormality. In some cases, the user may take no action regardless of the abnormality notification, based on his/her experience or expertise.

In some embodiments, the method 1600 may detect abnormality of the application based on a combination of two or more different abnormality detection requirements. For example, the method 1600 may calculate a value of battery power consumption and a value of Wi-Fi lock holding time based on the data related to usage of the hardware, and compare each of the values to a corresponding threshold. Different criteria may be defined to determine whether abnormality is detected. For example, when both the values exceed their corresponding thresholds, the method 1600 determines that abnormality is detected. In another example, when either of the two values exceeds its corresponding threshold, abnormality is determined to be detected.

At step 1610, the method 1600 may update the threshold based on the determination in step 1606. The threshold may be updated to more conservatively protect the computing device from being negatively affected by abnormality of the application, e.g., in terms of power consumption, overheat, performance, user experience, etc. Taking Whatsapp as an example for illustrate purposes, when the power consumed by Whatsapp is 10 W (i.e., a value calculated based on data related to hardware accessed by Whatsapp and using a model) while the threshold is 3 W, the method 1600 determines that Whatsapp is running abnormally, and closes Whatsapp. Because of the detection of the abnormality of Whatsapp, the method 1600 may determine to further decrease the threshold, e.g., by 0.5 W, for an earlier abnormality detection next time. In another example, if a user does not take any action in response to detection of abnormality of Whatsapp, the calculated power consumed, i.e., 10 W, may be used as a new threshold specific to the user, and will be used for detection abnormality based on power consumption from there on, Various rules may be defined to determine whether and how a threshold is updated. The method 1600 may update or adjust the threshold each time when an abnormality is detected, or after a pre-determined number of times that abnormality is detected. The method 1600 may also request the user of the computing device to determine whether the threshold is to be updated, and/or how the threshold is updated. The updated threshold resulted from step 1610 is a threshold specific to the application running on the computing device and corresponding to the abnormality detection condition.

In some embodiments, the threshold or a set of thresholds may be received by the computing device from a server, e.g., a cloud server. The threshold received from the server may be referred to as a common threshold that is applicable to all applications or a group of applications with respect to an abnormality detection requirement. The computing device can perform abnormality detection for any application (or any application in the group) according to the abnormality detection requirement using the same common threshold. The computing device may receive from the server and maintain a list of common thresholds according to a set of abnormality detection requirements. The computing device may also receive an updated common threshold and replace a corresponding old common threshold with the updated common threshold.

In some embodiments, the computing device may receive an initial common threshold corresponding to an abnormality detection requirement, and uses the initial common threshold to determine application abnormality, e.g., by comparing a value of a parameter indicated by the abnormality detection requirement with the initial common threshold. The computing device may later receive an update (a second common threshold) of the initial common threshold, and replace the initial common threshold with the updated common threshold for application abnormality detection. When the computing device performs threshold update after detecting abnormality (e.g., using the second common threshold) as illustrated in step 1610 of FIG. 16, whereby generating a third threshold, the computing device does not replace the second updated common threshold with the third threshold. Instead, the computing device may store the third threshold as a device-specific threshold that is specifically applicable to the application on the computing device corresponding to the abnormality detection requirement. Thus, corresponding to the abnormality detection requirement, the computing device may have two thresholds, i.e., a common threshold and a device-specific threshold.

In some embodiments, the computing device may have a list of common thresholds and a set of user-specific thresholds corresponding to different abnormality detection requirement, as shown in Table 6. Table 6 shows three abnormality detection conditions, i.e., Wi-Fi lock holding time, GPU service time, and IO access rate, and each of the conditions corresponds to a common threshold and a device-specific threshold. The device-specific threshold may be associated with the application, e.g., using the application's name. Association of the device-specific threshold and the application may also include version information of the application. For example, as shown in Table 6, the device-specific threshold corresponding to IO access rate also includes a name of the application, i.e., "Whatsapp", and a version number of Whatsapp, i.e., "1.0.3".

TABLE 6

| Abnormality detection requirement | Common threshold | Device-specific threshold |
| --- | --- | --- |
| Wi-Fi lock holding time | 100 min | 128 min |
| GPU service time | 60 min | 72 min |
| IO access rate | 10 | 12, "Whatsapp" ver 1.0.3 |

When the computing device has both the common threshold and the device-specific threshold corresponding to an abnormality detection condition, the computing device may choose to use either of the thresholds for abnormality detection, e.g., based on a pre-defined rule or criterion. For example, when the common threshold and the device-specific threshold are close to each other, e.g., when the difference between the two thresholds is less than a difference threshold, the computing device may randomly pick one of the common threshold and the device-specific threshold. Otherwise, when the difference between the two thresholds is not less than the difference threshold, the device-specific threshold may be used. Other criteria may also be defined for selecting the common threshold or the device-specific threshold to detected application abnormality.

After the threshold is updated at step 1610, the method 1600 may then go back to step 1602 to continue to monitor the application (if the application is not killed or frozen) and detect abnormality of the application, or monitor other applications (if the application is killed or frozen). When the calculated value of the parameter does not exceed the threshold at step 1606, the method 1600 goes back to step 1602. The method 1600 does not take any action to the application, and the application will keep running.

The method 1600 may be implemented as a separate application executable on the computing device. The method 1600 may also be implemented as a daemon or a system process running on the background of the computing device. In either of these cases, when an embodiment application (or daemon process) is started or activated, the embodiment application may first load one or more models for calculating the value of the parameter for determining abnormality of the application. One or more common thresholds (and one or more device-specific thresholds), and one or more abnormality detection requirements may also be loaded. The method 1600 may detect abnormality of a single application, a group of applications, or each and every applications running on the computing device.

In some embodiments, the computing device may interact with a server, such as a cloud server, for determining and updating thresholds corresponding to different abnormality detection conditions. The computing device may be connected to the server with wire or wirelessly. As discussed above, the computing device may receive a common threshold, and/or an update of the common threshold from the cloud server. In some embodiments, the computing device may send data (such as the data discussed above with respect to FIG. 16) related to usage of hardware or services that are accessed by an application running on the computing device to the cloud server. The computing device may periodically upload all of such data obtained to the cloud server. The computing device may also send a common threshold and a device-specific threshold corresponding to an abnormality detection condition to the cloud server. In the case of sending the device-specific threshold, the computing device may also send information identifying the corresponding application and version information of the corresponding application. The data/information sent by the computing device to the server may be used by the server to determine a common threshold or update a common threshold. In some embodiments, the server may be configured to send a common threshold, or an updated common threshold to one or more devices. The server may periodically update the common threshold and send to one or more devices. The server may also be configured to receive data/information from one or more computing devices for determining and/or updating one or more common thresholds corresponding to different abnormality detection conditions. Examples of the information includes data related to usage of hardware or services that are accessed by an application on a computing device, a common threshold corresponding to an abnormality detection condition, a device-specific threshold corresponding to an abnormality detection condition, and information about an application, such as application name, version number, etc.

Figure 17:
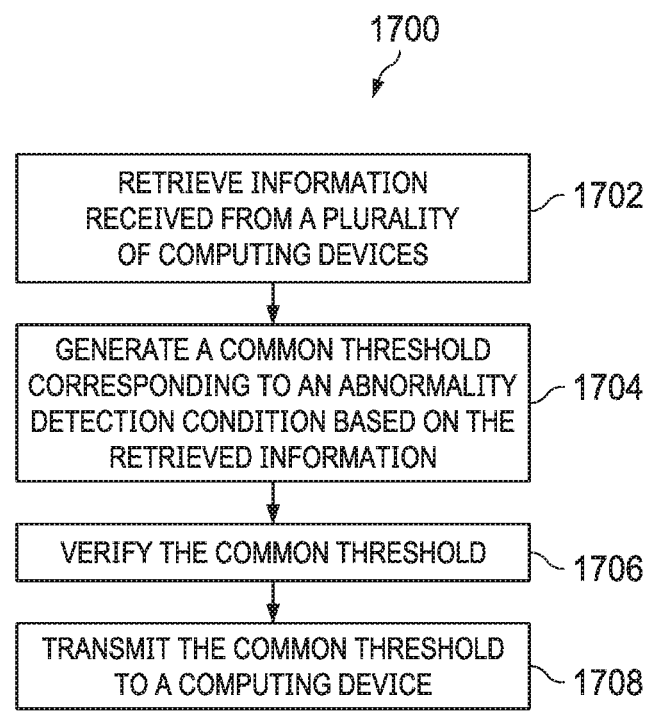
FIG. 17 illustrates a flowchart of an embodiment method for determining a threshold for application anomaly detection.

In some embodiments, the server or a remote control device may receive the information, as discussed above, from a plurality of devices and determines a common threshold (or an updated common threshold) corresponding to an abnormality detection condition based on the received information. FIG. 17 illustrates a flowchart of an embodiment method 1700 for determining a common threshold corresponding to an abnormality detection condition. The method 1700 may be performed by a server, such as a cloud server, or a support device. As shown, at step 1702, the server retrieves, from a storage device, information transmitted by a plurality computing devices related to one or more applications running on the plurality of computing devices. The information, as discussed above with respect to FIG. 16, may include data related to usage of hardware, services, or other resources accessed by the respective applications on the respective computing devices. The data may include foreground usage of a CPU, background usage of a CPU, wake-lock holding time, a number of self-start, on-screen time of the application, cellular usage and pattern, Wi-Fi usage and pattern, memory usage, a number of times for accessing an IO device, or location service usage, GPU usage, a number of notifications of arrival, usage of audio services, or a number of access to user-data, or any combination thereof. The information may also include application data, such as a name or an identifier of an application, and version information of the application. The information may further include a common threshold and/or a device-specific threshold used by a computing device corresponding to an abnormality detection condition. The information may be stored in a cloud storage for a fixed amount of time specified by end user license agreement (EULA). The method 1700 may periodically retrieve the latest uploaded information from a cloud storage, extract needed features, performs analysis, and compile a common threshold or a list of common thresholds.

At step 1704, the method 1700 generates a common threshold corresponding to an abnormality detection condition based on the retrieved information. The method 1700 may generate common thresholds corresponding to different abnormality detection conditions based on the retrieved information. In some embodiments, the method 1700 may input all or a part of the information into a cloud-side learning module, which outputs a common threshold corresponding to an abnormality detection condition. The cloud-side learning module may be a machine learning module configured to train a learning network using input information. For example, the could-side learning module can be, but not limited to, a Bayesian estimation model, a regression model, a convolution neural network (CNN), or an ensemble of decision trees, etc. Examples of the learning network may include a multi-layer neural network, or a regression learning network. The cloud-side learning module may use any machine learning mechanism to obtain a common threshold based on the information received from the computing devices.

At step 1706, the method 1700 verifies the generated common threshold. For example, a domain expert may examine the generated common threshold, or check its accuracy, for example using system or application logs. The common threshold may also be changed based on experts' inputs. At step 1708, the method 1700 transmits the generated common threshold to a computing device. The generated common threshold may be an initial common threshold that the computing device uses for determining abnormality of an application according to an abnormality detection condition. The generated common threshold may also be an updated common threshold to the computing device. In this case, the computing device replaces its common threshold with this updated common threshold. The method 1700 may transmit the generated common threshold through an over-the-air (OTA) push or transfer. The method 1700 may also transmit the generated common threshold to the computing device by way of software update. In this case, the generated common threshold may be bundled with system software when updating the software, or downloaded from an application store.

In the embodiment methods, a computing device may detect application abnormality during running of an application according to one or more abnormality detection conditions and utilizing data collected related to the running of the application and one or more common thresholds provided by a cloud server, and the cloud server determines the one or more common thresholds based on data provided by the computing device and/or other computing devices related to application execution. Both of the computing device and the cloud server may periodically update the one or more common thresholds (on the cloud side and based on data provided by the computing device and/or other computing devices) and generate one or more device-specific thresholds (on the device side and based on detection of abnormality). In this way, the computing device and the cloud server collaboratively implement detection of application abnormality in real time, and consequently improve performance of the computing device and thus user experience.

Figure 18:
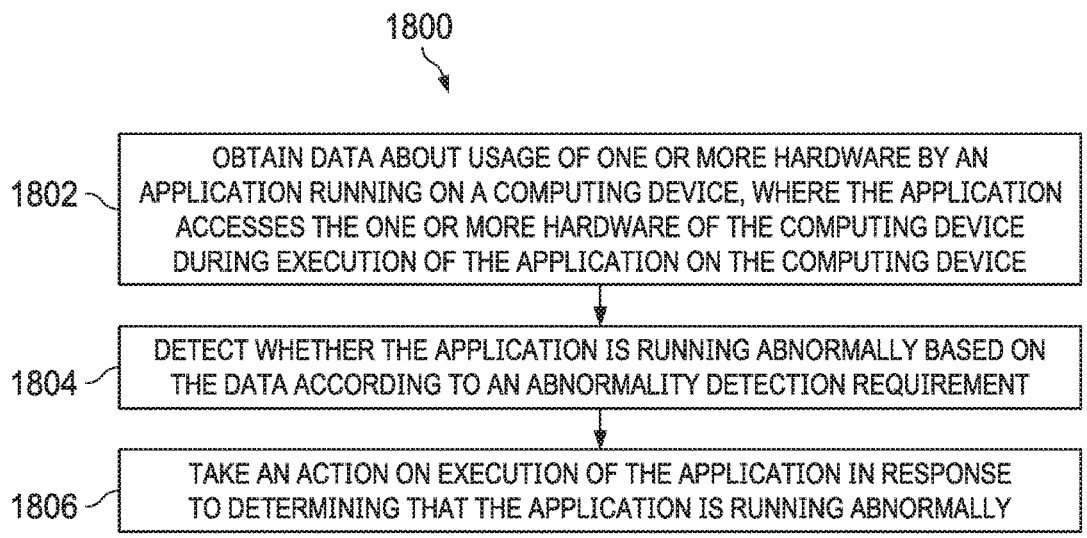
FIG. 18 illustrates a flowchart of another embodiment method for application abnormality detection.

FIG. 18 illustrates a flowchart of an embodiment method 1800 for application abnormality detection. The method 1800 may be a computer-implemented method. The method 1800 is indicative of operations at a computing device. As shown, at step 1802, the method 1800 obtains data about usage of one or more hardware by an application running on a computing device, where the application accesses the one or more hardware of the computing device during execution of the application on the computing device. The method 1800 may obtain data about usage of one or more other resources, such as services, accessed by the application, and use the data for detecting anomaly of the application. At step 1804, the method 1800 detects whether the application is running abnormally based on the data according to an abnormality detection requirement. The abnormality detection requirement indicates a parameter to be used for determining abnormality of the application. Detecting whether the application is running abnormally is performed by comparing a value of the parameter that is calculated based on the data with a threshold corresponding to the abnormality detection requirement. At step 1806, the method 1800 takes an action on execution of the application in response to determining that the application is running abnormally.

In some embodiments, the data about the usage of the one or more hardware comprises foreground usage of a CPU, background usage of a CPU, wake-lock holding time, number of self-start, on-screen time of the application, cellular usage and pattern, Wi-Fi usage and pattern, memory usage, IO device usage, e.g., a number of access times of an IO device, or location service usage, e.g., a number of location services that are used.

In some embodiments, the data about the usage of the one or more hardware may further comprise usage of a graphic processing unit (GPU), a number of notification of arrivals, version information of the application, usage of audio services, or a number of access to user-data.

In some embodiments, the parameter comprises a memory space taken by the application, an access rate of an IO device, wake-lock holding time, Wi-Fi lock holding time, GPU service time, CPU service time, or CPU background running time.

In some embodiments, taking the action on execution of the application comprises freezing the execution of the application, or killing the application.

In some embodiments, taking the action on execution of the application comprises generating a notification notifying that the application is running abnormally.

In some embodiments, the method 1800 may monitor usage of the one or more hardware during execution of the application for a period of time.

In some embodiments, the method 1800 may associate the data obtained with the application.

In some embodiments, the method 1800 may calculate the value of the parameter using a pre-established model.

In some embodiments, the method 1800 may determine that abnormality occurs to the application when the parameter value exceeds the threshold.

In some embodiments, the method 1800 may receive the threshold from a cloud server. In some embodiments, the received threshold is a common threshold applicable for different applications.

In some embodiments, the method 1800 may update the threshold after determining that the application is running abnormally.

In some embodiments, the updated threshold is a device-specific threshold specifically applicable to the application running on the computing device corresponding to the abnormality detection requirement.

In some embodiments, the method 1800 may transmit the data about the usage and the threshold to a cloud server.

In some embodiments, the method 1800 may transmit an updated threshold to the cloud server. In some embodiments, transmitting the data about the usage and the threshold to the cloud server is performed periodically.

In some embodiments, detecting whether the application is running abnormally is performed periodically or on demand.

In some embodiments, the method 1800 may receive an updated threshold from a cloud server, and replace the threshold with the updated threshold.

Embodiments of the present disclosure may be implemented as computer-implemented methods. The embodiments may be performed by a processing system. The embodiment methods in this disclosure may be implemented as computer instructions stored in a non-transitory computer-readable medium and executable by one or more processors. The computer-readable non-transitory media includes all types of computer readable media, including magnetic storage media, optical storage media, flash media and solid state storage media. It should be understood that abnormality detection model and related software can be pre-installed in a computing device. Alternatively the software can be obtained and loaded into the computing device, including obtaining the software through physical medium or distribution system, including, for example, from a server owned by the software creator or from a server not owned but used by the software creator. The software can be stored on a server for distribution over the Internet, for example.

Figure 19:
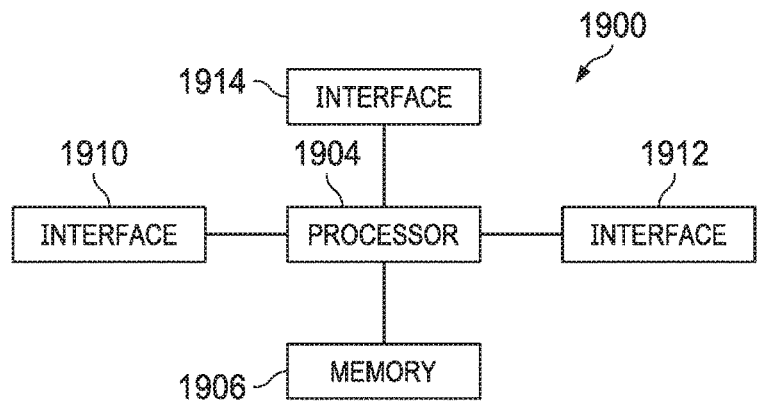
FIG. 19 is a block diagram of a processing or computing system.

FIG. 19 illustrates a block diagram of an embodiment processing system 1900 for performing methods described herein, which may be installed in a host device. As shown, the processing system 1900 includes a processor 1904, a memory 1906, and interfaces 1910-1914, which may (or may not) be arranged as shown in FIG. 19. The processor 1904 may be any component or collection of components adapted to perform computations and/or other processing related tasks, and the memory 1906 may be any component or collection of components adapted to store programming and/or instructions for execution by the processor 1904. In an embodiment, the memory 1906 includes a non-transitory computer readable medium. The interfaces 1910, 1912, 1914 may be any component or collection of components that allow the processing system 1900 to communicate with other devices/components and/or a user. For example, one or more of the interfaces 1910, 1912, 1914 may be adapted to communicate data, control, or management messages from the processor 1904 to applications installed on the host device and/or a remote device. As another example, one or more of the interfaces 1910, 1912, 1914 may be adapted to allow a user or user device (e.g., personal computer (PC), etc.) to interact/communicate with the processing system 1900. The processing system 1900 may include additional components not depicted in FIG. 19, such as long term storage (e.g., non-volatile memory, etc.).

In some embodiments, the processing system 1900 is included in a network device that is accessing, or part otherwise of, a telecommunications network. In one example, the processing system 1900 is in a network-side device in a wireless or wireline telecommunications network, such as a base station, a relay station, a scheduler, a controller, a gateway, a router, an applications server, or any other device in the telecommunications network. In other embodiments, the processing system 1900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 20:
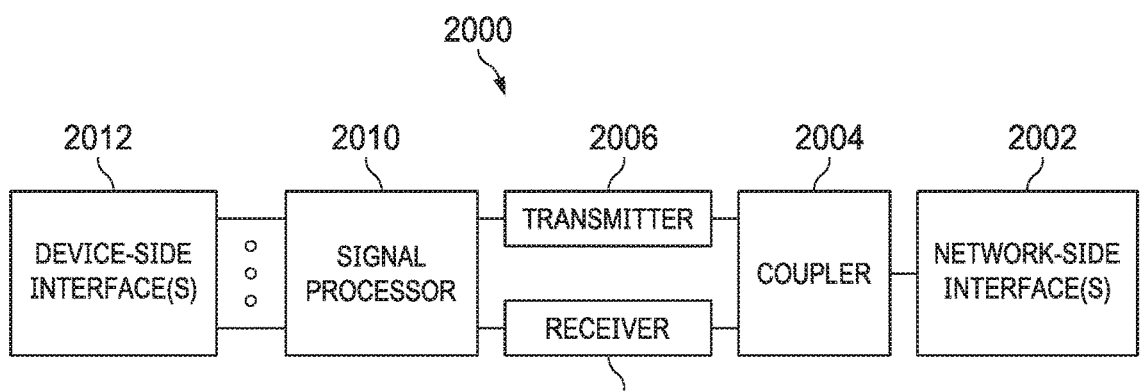
FIG. 20 is a block diagram of a transceiver.

In some embodiments, one or more of the interfaces 1910, 1912, 1914 connects the processing system 1900 to a transceiver adapted to transmit and receive signaling over the telecommunications network. FIG. 20 illustrates a block diagram of a transceiver 2000 adapted to transmit and receive signaling over a telecommunications network. The transceiver 2000 may be installed in a host device. As shown, the transceiver 2000 comprises a network-side interface 2002, a coupler 2004, a transmitter 2006, a receiver 2008, a signal processor 2010, and a device-side interface 2012. The network-side interface 2002 may include any component or collection of components adapted to transmit or receive signaling over a wireless or wireline telecommunications network. The coupler 2004 may include any component or collection of components adapted to facilitate bi-directional communication over the network-side interface 2002. The transmitter 2006 may include any component or collection of components (e.g., up-converter, power amplifier, etc.) adapted to convert a baseband signal into a modulated carrier signal suitable for transmission over the network-side interface 2002. The receiver 2008 may include any component or collection of components (e.g., down-converter, low noise amplifier, etc.) adapted to convert a carrier signal received over the network-side interface 2002 into a baseband signal. The signal processor 2010 may include any component or collection of components adapted to convert a baseband signal into a data signal suitable for communication over the device-side interface(s) 2012, or vice-versa. The device-side interface(s) 2012 may include any component or collection of components adapted to communicate data-signals between the signal processor 2010 and components within the host device (e.g., the processing system 190o, local area network (LAN) ports, etc.).

The transceiver 2000 may transmit and receive signaling over any type of communications medium. In some embodiments, the transceiver 2000 transmits and receives signaling over a wireless medium. For example, the transceiver 2000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2002 comprises one or more antenna/radiating elements. For example, the network-side interface 2002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a obtaining unit/module for obtaining data and obtaining abnormality detection module, a determining unit/module for determining abnormality of an application or process, an assigning unit/module for assigning abnormality levels to data associated with an application, a calculating unit/module, an action taking unit/module, a downloading unit/module, an uploading unit/module, an abnormality categorizing unit/module, a data analysis unit/module, an abnormality detection unit/module, a customization unit/module, a data retrieving unit/module, a data collection unit/module, a probability estimating unit/module, a machine learning unit/module, a detection result combining unit/module, an identifying unit/module, a training unit/module, a notifying unit/module, a push unit/module, a model building unit/module, a monitoring unit/module, an updating unit/module, and/or a detecting unit/module. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description.

It is therefore intended that the appended claims encompass any such modifications or embodiments.

What is claimed is:

1. A method comprising:
receiving, by a computing device, a plurality of abnormality detection models from a remote device, each of the plurality of abnormality detection models being trainable using a machine learning technique for detecting anomaly of a software application in a resource usage;
obtaining resource usage data of the software application according to requirements of the plurality of abnormality detection models, the resource usage data comprising information about usage or energy consumption of hardware components or services accessed by the software application on the computing device;
generating, by the computing device using a first abnormality detection model of the plurality of abnormality detection models based on the resource usage data, a first abnormality detection result indicating a first abnormality level of a plurality of abnormality levels that the software application has with respect to the resource usage;
generating, by the computing device using a second abnormality detection model of the plurality of abnormality detection models based on the resource usage data, a second abnormality detection result indicating corresponding probabilities of the software application falling in the plurality of abnormality levels with respect to the resource usage, wherein the corresponding probabilities includes a first probability of the software application falling in the first abnormality level of the plurality of abnormality levels and a second probability falling in a second abnormality level of the plurality of abnormality levels, wherein a sum of the corresponding probabilities equals 100%;
determining, by the computing device based on the first abnormality level indicated by the first abnormality detection result and the corresponding probabilities indicated by the second abnormality detection result, whether the software application has an anomaly in the resource usage; and
taking, by the computing device, an action on execution of the software application based on at least one of the first abnormality level or the corresponding probabilities in response to determination on the anomaly of the software application in the resource usage.

2. The method of claim 1, wherein the resource usage data comprises energy consumption, usage, an energy pattern, or a usage pattern of a hardware component or a service accessed in the computing device under an execution condition of the software application, the execution condition indicating whether the software application is being executed in a foreground, in a background, with screen on, or with screen off, the usage pattern of the hardware component comprising a time series representing resource usages of the hardware component for a period of time, and the energy pattern of the hardware component comprising a time series representing the energy consumption of the hardware component for the period of time.

3. The method of claim 1, wherein the resource usage data comprises information about the computing device, information about the software application, an environmental condition of using the computing device, performance of the computing device, or a location of the computing device, date or time.

4. The method of claim 1, wherein the first abnormality detection result and the second abnormality detection result are generated using different sets of data in the resource usage data of the software application.

5. The method of claim 1, wherein whether the software application has the anomaly in the resource usage is determined utilizing a model that is trainable with the machine learning technique.

6. The method of claim 1, wherein whether the software application has the anomaly in the resource usage is determined using majority voting or weighted sum based on the first abnormality detection result and the second abnormality detection result.

7. The method of claim 1, wherein taking the action on the execution of the software application comprises freezing the execution of the software application, re-starting the software application, killing the software application, or communicating or generating one or more notifications notifying that the software application is running abnormally.

8. The method of claim 1, further comprising:
updating one of the plurality of abnormality detection models from the remote device.

9. The method of claim 1, wherein determining whether the software application has the anomaly in the resource usage comprises:
determining whether a service or a resource used by the software application is allowed by the software application or considered as a normal use case.

10. The method of claim 1, further comprising:
generating, by the computing device using a third abnormality detection model of the plurality of abnormality detection models based on the resource usage data, a third abnormality detection result indicating the second abnormality level of the plurality of abnormality levels that the software application has with respect to the resource usage, wherein the third abnormality detection model and the first abnormality detection model are trained using different machine learning techniques; and
wherein whether the software application has the anomaly in the resource usage is determined based on the first abnormality detection result, the second abnormality detection result, and third abnormality detection result.

11. The method of claim 1, further comprising:
producing a set of historical data for the software application, the set of historical data comprising abnormality detection results of the software application, actions taken in response to the abnormality detection results of the software application, usage patterns of the software application, or energy consumption patterns of the software application; and
adjusting the action to be taken for the software application corresponding to anomaly of the software application based on the set of historical data.

12. The method of claim 1, further comprising:
collecting, for a period of time, data about abnormality detection results of the software application and about corresponding actions taken in response to abnormality detection results; and
adjusting the action taken in response to the anomaly of the software application using an adaptation or customization model that is built based on the data that is collected.

13. A non-transitory computer-readable media storing computer instructions, that when executed by one or more processors, cause the one or more processors to perform steps of:

receiving, by a computing device, a plurality of abnormality detection models from a remote device, each of the plurality of abnormality detection models being trainable using a machine learning technique for detecting anomaly of a software application in a resource usage;

obtaining resource usage data of the software application according to requirements of the plurality of abnormality detection models, the resource usage data comprising information about usage or energy consumption of hardware components or services accessed by the software application on the computing device;

generating, by the computing device using a first abnormality detection model of the plurality of abnormality detection models based on the resource usage data, a first abnormality detection result indicating a first abnormality level of a plurality of abnormality levels that the software application has with respect to the resource usage;

generating, by the computing device using a second abnormality detection model of the plurality of abnormality detection models based on the resource usage data, a second abnormality detection result indicating corresponding probabilities of the software application falling in the plurality of abnormality levels with respect to the resource usage, wherein the corresponding probabilities includes a first probability of the software application falling in the first abnormality level of the plurality of abnormality levels and a second probability falling in a second abnormality level of the plurality of abnormality levels, wherein a sum of the corresponding probabilities equals 100%;

determining, by the computing device based on the first abnormality level indicated by the first abnormality detection result and the corresponding probabilities indicated by the second abnormality detection result, whether the software application has an anomaly in the resource usage; and taking, by the computing device, an action on execution of the software application based on at least one of the first abnormality level or the corresponding probabilities in response to determination on the anomaly of the software application in the resource usage.

14. The non-transitory computer-readable media of claim 13, wherein the resource usage data comprises energy consumption, usage, an energy pattern, or a usage pattern of a hardware component or a service accessed in the computing device under an execution condition of the software application, the execution condition indicating whether the software application is being executed in a foreground, in a background, with screen on, with screen off, information about the computing device, information about the software application, an environmental condition of using the computing device, performance of the computing device, or a location of the computing device, date or time, the usage pattern of the hardware component comprising a time series representing resource usages of the hardware component for a period of time, and the energy pattern of the hardware component comprising a time series representing the energy consumption of the hardware component for the period of time.

15. The non-transitory computer-readable media of claim 13, wherein the first abnormality detection result and the second abnormality detection result are generated using different sets of data in the resource usage data of the software application.

16. The non-transitory computer-readable media of claim 13, wherein whether the software application has the anomaly in the resource usage is determined using majority voting or weighted sum based on the first abnormality detection result and the second abnormality detection result.

17. The non-transitory computer-readable media of claim 13, wherein taking the action on the execution of the software application comprises freezing the execution of the software application, re-starting the software application, killing the software application, or communicating or generating one or more notifications notifying that the software application is running abnormally.

18. The non-transitory computer-readable media of claim 13, wherein the computer instructions, when executed by the one or more processors, cause the one or more processors to further perform:

generating, using a third abnormality detection model of the plurality of abnormality detection models based on the resource usage data, a third abnormality detection result indicating the second abnormality level of the plurality of abnormality levels that the software application has with respect to the resource usage, wherein the third abnormality detection model and the first abnormality detection model are trained using different machine learning techniques; and wherein whether the software application has the anomaly in the resource usage is determined based on the first abnormality detection result, the second abnormality detection result, and third abnormality detection result.

19. The non-transitory computer-readable media of claim 13, wherein the computer instructions, when executed by the one or more processors, cause the one or more processors to further perform:

producing a set of historical data for the software application, the set of historical data comprising abnormality detection results of the software application, actions taken in response to the abnormality detection results of the software application, usage patterns of the software application, or energy consumption patterns of the software application; and adjusting the action to be taken for the software application corresponding to anomaly of the software application based on the set of historical data.

20. The non-transitory computer-readable media of claim 13, wherein the computer instructions, when executed by the one or more processors, cause the one or more processors to further perform:

collecting, for a period of time, data about abnormality detection results of the software application and about corresponding actions taken in response to abnormality detection results; and adjusting the action taken in response to the anomaly of the software application using an adaptation or customization model that is built based on the data that is collected.

* * * * *